(12) United States Patent
Iwamoto et al.

(10) Patent No.: US 10,987,905 B2
(45) Date of Patent: Apr. 27, 2021

(54) INTERLAYER FILM FOR LAMINATED GLASS, AND LAMINATED GLASS

(71) Applicant: SEKISUI CHEMICAL CO., LTD., Osaka (JP)

(72) Inventors: Tatsuya Iwamoto, Kouka (JP); Nami Minakuchi, Kouka (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 108 days.

(21) Appl. No.: 15/757,944

(22) PCT Filed: Sep. 9, 2016

(86) PCT No.: PCT/JP2016/076597
§ 371 (c)(1),
(2) Date: Mar. 6, 2018

(87) PCT Pub. No.: WO2017/043624
PCT Pub. Date: Mar. 16, 2017

(65) Prior Publication Data
US 2018/0339495 A1 Nov. 29, 2018

(30) Foreign Application Priority Data

Sep. 11, 2015 (JP) .............................. JP2015-180215
Sep. 11, 2015 (JP) .............................. JP2015-180216
(Continued)

(51) Int. Cl.
*B32B 17/10* (2006.01)
*B60J 1/00* (2006.01)
(Continued)

(52) U.S. Cl.
CPC .......... *B32B 17/10761* (2013.01); *B32B 7/02* (2013.01); *B32B 7/027* (2019.01);
(Continued)

(58) Field of Classification Search
CPC ....... B32B 17/10761; B32B 7/00–7/14; B32B 27/306
See application file for complete search history.

(56) References Cited

U.S. PATENT DOCUMENTS 3,341,399 A * 9/1967 Hazdra ................... C03C 27/10
428/429
5,340,654 A 8/1994 Ueda et al.
(Continued)

FOREIGN PATENT DOCUMENTS

| CN | 102575080 A | 7/2012 |
| CN | 103140450 A | 6/2013 |

(Continued)

OTHER PUBLICATIONS

Written Opinion of the International Searching Authority (PCT/ISA/237) for Application No. PCT/JP2016/076597 dated Dec. 6, 2016 (English Translation dated Mar. 22, 2018).
(Continued)

*Primary Examiner* — Prashant J Khatri
(74) *Attorney, Agent, or Firm* — Cheng Law Group, PLLC (57) ABSTRACT

There is provided an interlayer film for laminated glass with which the sound insulating properties in a high frequency area of 2000 Hz or more can be effectively enhanced. The interlayer film for laminated glass according to the present invention has a two or more-layer structure and is provided with a first layer containing a thermoplastic resin and a second layer containing a thermoplastic resin, the second layer is arranged on a first surface side of the first layer, and the interlayer film is provided with Constitution A: "the glass transition temperature of the second layer being 32° C. or more, the glass transition temperature of the first layer being lower than the glass transition temperature of the second layer, and the thickness of the interlayer film being
(Continued)

more than 787 μm and 950 μm or less" or Constitution B: "the glass transition temperature of the second layer being 25° C. or more, the glass transition temperature of the first layer being lower than the glass transition temperature of the second layer, and the thickness of the interlayer film being more than 950 μm".

18 Claims, 1 Drawing Sheet

(30) Foreign Application Priority Data

Sep. 11, 2015 (JP) .............................. JP2015-180217
Feb. 5, 2016 (JP) .............................. JP2016-021340

(51) Int. Cl.
| | | |
|---|---|---|
| *B32B 27/30* | (2006.01) | |
| *B32B 7/02* | (2019.01) | |
| *B32B 7/027* | (2019.01) | |
| *B32B 27/08* | (2006.01) | |
| *B32B 27/22* | (2006.01) | |

(52) U.S. Cl.
CPC .... *B32B 17/10036* (2013.01); *B32B 17/1077* (2013.01); *B32B 17/10678* (2013.01); *B32B 17/10788* (2013.01); *B32B 27/08* (2013.01); *B32B 27/22* (2013.01); *B32B 27/30* (2013.01); *B32B 27/306* (2013.01); *B60J 1/00* (2013.01); *B32B 2250/03* (2013.01); *B32B 2307/102* (2013.01); *B32B 2329/00* (2013.01); *B32B 2329/06* (2013.01); *Y10T 428/2495* (2015.01)

(56) References Cited

U.S. PATENT DOCUMENTS

| | | | |
|---|---|---|---|
| 2005/0170160 A1 | 8/2005 | Moran et al. | |
| 2006/0210776 A1* | 9/2006 | Lu ........................... | B32B 17/10 428/192 |
| 2006/0210782 A1 | 9/2006 | Lu | |
| 2008/0032138 A1 | 2/2008 | Toyama et al. | |
| 2010/0028642 A1* | 2/2010 | Steuer ............... | B32B 17/10761 428/220 |
| 2012/0202070 A1 | 8/2012 | Asanuma et al. | |
| 2012/0288722 A1 | 11/2012 | Iwamoto et al. | |
| 2013/0143049 A1 | 6/2013 | Kitano et al. | |
| 2013/0183507 A1 | 7/2013 | Matsuda et al. | |
| 2013/0236693 A1 | 9/2013 | Lu | |
| 2013/0236711 A1 | 9/2013 | Lu | |
| 2013/0323516 A1 | 12/2013 | Shimamoto et al. | |
| 2014/0363651 A1* | 12/2014 | Lu ....................... | B32B 17/1055 428/217 |
| 2015/0079366 A1 | 3/2015 | Lu | |
| 2015/0079373 A1 | 3/2015 | Lu | |
| 2016/0159039 A1* | 6/2016 | Lu ..................... | B32B 17/10605 428/437 |
| 2016/0200076 A1 | 7/2016 | Lu | |
| 2016/0279905 A1 | 9/2016 | Iwamoto et al. | |
| 2016/0311199 A1 | 10/2016 | Iwamoto et al. | |
| 2017/0100918 A1 | 4/2017 | Lu | |
| 2017/0100919 A1 | 4/2017 | Lu | |
| 2019/0099986 A1 | 4/2019 | Lu | |
| 2019/0105880 A1 | 4/2019 | Ukidwe et al. | |

FOREIGN PATENT DOCUMENTS

| | | | |
|---|---|---|---|
| CN | 105658595 A | | 6/2016 |
| JP | 5-104687 A | | 4/1993 |
| JP | 5-330864 A | | 12/1993 |
| JP | 9-156967 A | | 6/1997 |
| JP | 2007-70200 A | | 3/2007 |
| JP | 2011-132120 A | | 7/2011 |
| JP | 2013-10671 A | | 1/2013 |
| JP | 2015-155376 A | | 8/2015 |
| TW | 201341332 A | | 10/2013 |
| WO | WO-2011/078314 A1 | | 6/2011 |
| WO | WO-2015/108118 A1 | | 7/2015 |
| WO | WO-2015/108119 A1 | | 7/2015 |

OTHER PUBLICATIONS

Written Opinion of the International Searching Authority (PCT/ISA/237) for Application No. PCT/JP2016/076598 dated Dec. 6, 2016 (English Translation dated Mar. 22, 2018).
International Search Report for the Application No. PCT/JP2016/076597 dated Dec. 6, 2016.
Written Opinion of the International Searching Authority (PCT/ISA/237) for Application No. PCT/JP2016/076597 dated Dec. 6, 2016.
International Search Report for the Application No. PCT/JP2016/076598 dated Dec. 6, 2016.
Written Opinion of the International Searching Authority (PCT/ISA/237) for Application No. PCT/JP2016/076598 dated Dec. 6, 2016.
Supplementary European Search Report for the Application No. EP 16 844 485.9 dated Jun. 26, 2019.
Supplementary European Search Report for the Application No. EP 16 844 486.7 dated May 9, 2019.
Wade, Bruce, "Vol. 8 Vinyl Acetal Polymers", Encyclopedia of Polymer Science and Technology, 2003, pp. 381-399 (XP055118702).
Non-Final Office Action for the U.S. Appl. No. 15/757,962 from the United States Patent and Trademark Office dated Oct. 17, 2019.
Notification of Reasons for Refusal for the Application No. 2016-560015 from Japan Patent Office dated Mar. 3, 2020.
Notification of Reasons for Refusal for the Application No. 2016-564290 from Japan Patent Office dated Mar. 3, 2020.
Examination Report for Application No. 201717045711 from Intellectual Property India Patent Office dated Feb. 14, 2020.
Taiwanese Office Action for the Application No. 105129445 dated Mar. 3, 2020.
The First Office Action for the Application No. 201680052416.5 from The State Intellectual Property Office of the People's Republic of China dated Jun. 2, 2020.
Non-Final Office Action for the U.S. Appl. No. 15/757,962 from United States Patent and Trademark Office dated Sep. 2, 2020.
Final Office Action for the U.S. Appl. No. 15/757,962 from United States Patent and Trademark Office dated Feb. 26, 2021.

* cited by examiner

INTERLAYER FILM FOR LAMINATED GLASS, AND LAMINATED GLASS

TECHNICAL FIELD

The present invention relates to an interlayer film for laminated glass which is used for obtaining laminated glass. Moreover, the present invention relates to laminated glass prepared with the interlayer film for laminated glass.

BACKGROUND ART

Since laminated glass generates only a small amount of scattering glass fragments even when subjected to external impact and broken, laminated glass is excellent in safety. As such, the laminated glass is widely used for automobiles, railway vehicles, aircraft, ships, buildings, and the like. The laminated glass is produced by sandwiching an interlayer film for laminated glass between two glass plates.

Examples of the interlayer film for laminated glass include a single-layered interlayer film having a one-layer structure and a multi-layered interlayer film having a two or more-layer structure.

As an example of the interlayer film for laminated glass, the following Patent Document 1 discloses a sound insulating layer including 100 parts by weight of a polyvinyl acetal resin with an acetalization degree of 60 to 85% by mole, 0.001 to 1.0 part by weight of at least one kind of metal salt among an alkali metal salt and an alkaline earth metal salt, and a plasticizer in an amount more than 30 parts by weight. This sound insulating layer can be used alone as a single-layered interlayer film.

Furthermore, the following Patent Document 1 also describes a multi-layered interlayer film in which the sound insulating layer and another layer are layered. Another layer to be layered with the sound insulating layer includes 100 parts by weight of a polyvinyl acetal resin with an acetalization degree of 60 to 85% by mole, 0.001 to 1.0 part by weight of at least one kind of metal salt among an alkali metal salt and an alkaline earth metal salt, and a plasticizer in an amount of 30 parts by weight or less.

The following Patent Document 2 discloses an interlayer film which is constituted of a polymer layer having a glass transition temperature of 33° C. or more.

RELATED ART DOCUMENTS

Patent Documents

Patent Document 1: JP 2007-070200 A
Patent Document 2: US 2013/0236711 A1

SUMMARY OF THE INVENTION

Problems to be Solved by the Invention

With regard to laminated glass prepared with such conventional interlayer films described in Patent Documents 1 and 2, the sound insulating properties in a high frequency area of 2000 Hz or more of the laminated glass are not sufficient, and in particular, the sound insulating properties in a high frequency area of about 4000 Hz of the laminated glass are not sufficient.

An object of the present invention is to provide an interlayer film for laminated glass with which the sound insulating properties in a high frequency area of 2000 Hz or more can be effectively enhanced. Moreover, the present invention is also aimed at providing laminated glass prepared with the interlayer film for laminated glass.

Means for Solving the Problems

According to a broad aspect of the present invention, there is provided an interlayer film for laminated glass (hereinafter, sometimes abbreviated as an interlayer film) having a two or more-layer structure and being provided with a first layer containing a thermoplastic resin and a second layer containing a thermoplastic resin, the second layer being arranged on a first surface side of the first layer and the interlayer film being provided with the following Constitution A or the following Constitution B.

Constitution A: the glass transition temperature of the second layer being 32° C. or more, the glass transition temperature of the first layer being lower than the glass transition temperature of the second layer, and the thickness of the interlayer film being more than 787 μm and 950 μm or less Constitution B: the glass transition temperature of the second layer being 25° C. or more, the glass transition temperature of the first layer being lower than the glass transition temperature of the second layer, and the thickness of the interlayer film being more than 950 μm In a specific aspect of the interlayer film according to the present invention, the interlayer film is provided with the following Constitution AB'.

Constitution AB': the glass transition temperature of the second layer being 32° C. or more, the glass transition temperature of the first layer being lower than the glass transition temperature of the second layer, and the thickness of the interlayer film being more than 787 μm In a specific aspect of the interlayer film according to the present invention, the interlayer film is provided with only the first layer and the second layer and the total thickness of the first layer and the second layer is more than 787 μm.

In a specific aspect of the interlayer film according to the present invention, the interlayer film is provided with the Constitution B.

In a specific aspect of the interlayer film according to the present invention, the interlayer film is provided with only the first layer and the second layer and the total thickness of the first layer and the second layer is more than 950 μm.

In a specific aspect of the interlayer film according to the present invention, the interlayer film is provided with the second layer as a surface layer.

It is preferred that the thermoplastic resin in the first layer be a polyvinyl acetal resin. It is preferred that the thermoplastic resin in the second layer be a polyvinyl acetal resin. It is preferred that the first layer contain a plasticizer. It is preferred that the second layer contain a plasticizer.

In a specific aspect of the interlayer film according to the present invention, the interlayer film has a three or more-layer structure and is provided with a third layer containing a thermoplastic resin and the third layer is arranged on a second surface side opposite to the first surface of the first layer.

In a specific aspect of the interlayer film according to the present invention, the glass transition temperature of the third layer is 25° C. or more and the glass transition temperature of the first layer is lower than the glass transition temperature of the third layer.

In a specific aspect of the interlayer film according to the present invention, the glass transition temperature of the third layer is 32° C. or more and the glass transition temperature of the first layer is lower than the glass transition temperature of the third layer.

In a specific aspect of the interlayer film according to the present invention, the interlayer film is provided with the third layer as a surface layer.

It is preferred that the thermoplastic resin in the third layer be a polyvinyl acetal resin. It is preferred that the third layer contain a plasticizer.

According to a broad aspect of the present invention, there is provided laminated glass including a first lamination glass member, a second lamination glass member, and the above-described interlayer film for laminated glass, the interlayer film for laminated glass being arranged between the first lamination glass member and the second lamination glass member.

Effect of the Invention

Since the interlayer film for laminated glass according to the present invention has a two or more-layer structure and is provided with a first layer containing a thermoplastic resin and a second layer containing a thermoplastic resin, the second layer is arranged on a first surface side of the first layer, and the interlayer film is provided with the foregoing Constitution A or the foregoing Constitution B, the sound insulating properties in a high frequency area of 2000 Hz or more can be effectively enhanced.

MODE(S) FOR CARRYING OUT THE INVENTION

Hereinafter, the present invention will be described in detail.

The interlayer film for laminated glass (hereinafter, sometimes abbreviated as "the interlayer film") according to the present invention has a two or more-layer structure. The interlayer film according to the present invention may have a two-layer structure, may have a three-layer structure, and may have a three or more-layer structure.

The interlayer film according to the present invention is provided with a first layer containing a thermoplastic resin and a second layer containing a thermoplastic resin. In the interlayer film according to the present invention, the second layer is arranged on a first surface side of the first layer.

The interlayer film according to the present invention is provided with the following Constitution A or the following Constitution B. The interlayer film according to the present invention may be provided with the following Constitution A and may be provided with the following Constitution B.

Constitution A: the glass transition temperature of the second layer being 32° C. or more, the glass transition temperature of the first layer being lower than the glass transition temperature of the second layer, and the thickness of the interlayer film being more than 787 μm and 950 μm or less Constitution B: the glass transition temperature of the second layer being 25° C. or more, the glass transition temperature of the first layer being lower than the glass transition temperature of the second layer, and the thickness of the interlayer film being more than 950 μm With regard to the Constitution A:

In the interlayer film according to the present invention, the glass transition temperature (Tg) of the second layer is 32° C. or more. Furthermore, in the interlayer film according to the present invention, the glass transition temperature (Tg) of the first layer is lower than the glass transition temperature (Tg) of the second layer. The thickness of the interlayer film according to the present invention is more than 787 μm and 950 μm or less. When the interlayer film according to the present invention is provided with only the first layer and the second layer to have a two-layer structure, the total thickness of the first layer and the second layer is more than 787 μm. When the interlayer film according to the present invention is provided with the first layer, the second layer, and an additional layer (a third layer or the like) to have a three or more-layer structure, the total thickness of the first layer, the second layer, and the additional layer is more than 787 μm.

With regard to the Constitution B:

In the interlayer film according to the present invention, the glass transition temperature (Tg) of the second layer is 25° C. or more. Furthermore, in the interlayer film according to the present invention, the glass transition temperature (Tg) of the first layer is lower than the glass transition temperature (Tg) of the second layer. The thickness of the interlayer film according to the present invention is more than 950 μm. When the interlayer film according to the present invention is provided with only the first layer and the second layer to have a two-layer structure, the total thickness of the first layer and the second layer is more than 950 μm. When the interlayer film according to the present invention is provided with the first layer, the second layer, and an additional layer (a third layer or the like) to have a three or more-layer structure, the total thickness of the first layer, the second layer, and the additional layer is more than 950 μm.

In recent years, fueled vehicles employing an internal combustion engine have been shifting to electric vehicles employing an electric motor, hybrid electric vehicles employing an internal combustion engine and an electric motor, and the like. In laminated glass used for a fueled vehicle employing an internal combustion engine, the sound insulating properties in a relatively low frequency area are especially required. However, even in the laminated glass used for a fueled vehicle employing an internal combustion engine, it is desirable that the sound insulating properties in a high frequency area be high. In contrast, in laminated glass used for an electric vehicle and a hybrid electric vehicle which utilize an electric motor, high sound insulating properties in a high frequency area are especially required for effectively cutting off driving sounds of the electric motor.

Since the interlayer film according to the present invention is provided with the above-mentioned entire configuration (including the foregoing Constitution A or the foregoing Constitution B), the sound insulating properties in a high frequency area of 2000 Hz or more can be effectively enhanced. Furthermore, in the interlayer film according to the present invention, the sound insulating properties in a high frequency area of about 4000 Hz, which have hitherto been difficult to be enhanced, can also be enhanced.

The present inventors have found out that, by combining the constitution in which the glass transition temperature (Tg) of the second layer is the above lower limit or more (Tg is 32° C. or more when the thickness of an interlayer film is more than 787 μm and 950 μm or less, Tg is 25° C. or more when the thickness of an interlayer film is more than 950

μm) and the glass transition temperature (Tg) of the first layer is lower than the glass transition temperature (Tg) of the second layer and the constitution in which the thickness of an interlayer film is more than 787 μm, the sound insulating properties in a high frequency area can be effectively enhanced to the extent hardly attainable by the conventional technique.

Moreover, the present inventors have found out that, by combining the constitution in which the glass transition temperature (Tg) of the second layer is 32° C. or more and the glass transition temperature (Tg) of the first layer is lower than the glass transition temperature (Tg) of the second layer and the constitution in which the thickness of an interlayer film is more than 787 μm and 950 μm or less, the sound insulating properties in a high frequency area can be effectively enhanced to the extent hardly attainable by the conventional technique.

Moreover, the present inventors have found out that, by combining the constitution in which the glass transition temperature (Tg) of the second layer is 25° C. or more and the glass transition temperature (Tg) of the first layer is lower than the glass transition temperature (Tg) of the second layer and the constitution in which the thickness of an interlayer film is more than 950 μm, the sound insulating properties in a high frequency area can be effectively enhanced to the extent hardly attainable by the conventional technique.

Incidentally, there are cases where laminated glass prepared with a conventional interlayer film is low in penetration resistance.

There has hitherto been a problem that achieving both high sound insulating properties in a high frequency area of laminated glass and high penetration resistance thereof at the same time is difficult.

With the use of the interlayer film according to the present invention, the penetration resistance of laminated glass can also be enhanced. In the present invention, both high sound insulating properties and high penetration resistance can be achieved at the same time. In the present invention, the high penetration resistance is brought about not only by being relatively thick in thickness of the interlayer film but also by the limited constituent features other than the thicknesses of the first layer, the second layer, and the third layer. In particular, when the interlayer film according to the present invention is provided with the Constitution B, the penetration resistance is effectively enhanced and both high sound insulating properties and high penetration resistance can be achieved at a higher level.

In the present invention, there is provided an interlayer film for laminated glass, in particular, the interlayer film having a thickness of more than 950 μm, with which the sound insulating properties in a high frequency area of 2000 Hz or more can be effectively enhanced and the penetration resistance can also be enhanced.

From the viewpoint of further effectively enhancing the sound insulating properties in a high frequency area and the viewpoint of further effectively enhancing the penetration resistance of laminated glass, it is preferred that the interlayer film according to the present invention be provided with the following Constitution AB'. The range of Constitution AB' is narrower than the range combining Constitution A and Constitution B. In Constitution AB', a part of Constitution B is excluded.

Constitution AB': the glass transition temperature of the second layer being 32° C. or more, the glass transition temperature of the first layer being lower than the glass transition temperature of the second layer, and the thickness of the interlayer film being more than 787 μm In the Constitution A and the Constitution AB', Tg of the second layer is 32° C. or more. From the viewpoint of effectively enhancing the sound insulating properties in a high frequency area, in the Constitution A and the Constitution AB', Tg of the second layer is preferably 33° C. or more, more preferably 34° C. or more, and preferably 45° C. or less, and more preferably 44° C. or less.

In the Constitution B, Tg of the second layer is 25° C. or more. From the viewpoint of effectively enhancing the sound insulating properties in a high frequency area, in the Constitution B, Tg of the second layer is preferably 27° C. or more, more preferably 29° C. or more, further preferably 32° C. or more, especially preferably 34° C. or more, and preferably 45° C. or less, and more preferably 44° C. or less. In the Constitution B, Tg of the second layer may be less than 35° C.

From the viewpoint of effectively enhancing the sound insulating properties in a high frequency area, in the Constitution A and the Constitution AB', it is preferred that Tg of the third layer be 32° C. or more. From the viewpoint of further effectively enhancing the sound insulating properties in a high frequency area, in the Constitution A and the Constitution AB', Tg of the third layer is preferably 33° C. or more, more preferably 34° C. or more, and preferably 45° C. or less, and more preferably 44° C. or less.

From the viewpoint of effectively enhancing the sound insulating properties in a high frequency area, in the Constitution B, it is preferred that Tg of the third layer be 25° C. or more. From the viewpoint of further effectively enhancing the sound insulating properties in a high frequency area, in the Constitution B, Tg of the third layer is preferably 27° C. or more, more preferably 29° C. or more, further preferably 32° C. or more, especially preferably 34° C. or more, and preferably 45° C. or less, and more preferably 44° C. or less. In the Constitution B, Tg of the third layer may be less than 35° C.

Tg of the first layer is lower than Tg of the second layer. From the viewpoint of effectively enhancing the sound insulating properties in a high frequency area, the absolute value of a difference between Tg of the first layer and Tg of the second layer is preferably 32° C. or more, more preferably 34° C. or more, and preferably 55° C. or less, and more preferably 50° C. or less.

From the viewpoint of effectively enhancing the sound insulating properties in a high frequency area, it is preferred that Tg of the first layer be lower than Tg of the third layer. From the viewpoint of further effectively enhancing the sound insulating properties in a high frequency area, the absolute value of a difference between Tg of the first layer and Tg of the third layer is preferably 32° C. or more, more preferably 34° C. or more, and preferably 55° C. or less, and more preferably 50° C. or less.

Examples of a method of measuring the glass transition temperature include a method of measuring the viscoelasticity of an interlayer film with the use of a dynamic viscoelasticity measuring apparatus "DMA+1000" available from 01 dB-Metravib immediately after the interlayer film obtained is stored for 12 hours under an environment of a room temperature of 23±2° C. and a humidity of 25±5%. It is preferred that the interlayer film or each layer be cut into a size of 8 mm in longitudinal width by 5 mm in lateral width and be measured, using the shear mode, for the glass transition temperature under the condition in which the temperature is increased from −30° C. to 100° C. at a temperature increasing rate of 5° C./minute and under the condition of a frequency of 1 Hz and a strain of 0.08%.

The thickness of the interlayer film is more than 787 μm. From the viewpoints of effectively enhancing the sound insulating properties in a high frequency area and attaining a reduced weight of laminated glass, the thickness of the interlayer film is preferably 790 μm or more, more preferably 800 μm or more, more preferably 850 μm or more, even more preferably more than 950 μm, further preferably more than 960 μm, especially preferably 1000 μm or more, most preferably 1100 μm or more, and preferably 2000 μm or less, and more preferably 1800 μm or less. Moreover, when the thickness of the interlayer film is the above lower limit or more, the penetration resistance of laminated glass is further enhanced. When the thickness of the interlayer film is more than 950 μm, the penetration resistance is considerably enhanced. When the thickness of the interlayer film is the above upper limit or less, the transparency of the interlayer film is further improved.

In this connection, even when the thickness of an interlayer film is 380 μm or more and 787 μm or less, it is possible to enhance the sound insulating properties in a high frequency area as long as the interlayer film is provided with the constitution in which the glass transition temperature (Tg) of the second layer is the above lower limit or more and the glass transition temperature (Tg) of the first layer is lower than the glass transition temperature (Tg) of the second layer. On the other hand, it has been found out that making the thickness of the interlayer film more than 787 μm enables the effect of the present invention to be exerted at a higher level.

Moreover, even when the thickness of an interlayer film is 380 μm or more and 950 μm or less, it is possible to enhance the sound insulating properties in a high frequency area as long as the interlayer film is provided with the constitution in which the glass transition temperature (Tg) of the second layer is the above lower limit or more and the glass transition temperature (Tg) of the first layer is lower than the glass transition temperature (Tg) of the second layer. On the other hand, it has been found out that making the thickness of the interlayer film more than 950 μm enables the effect of the present invention to be exerted at a higher level.

From the viewpoint of effectively enhancing the sound insulating properties in a high frequency area of 1000 Hz or more, it is preferred that a ratio (T1/(T2+T3)) of the thickness of the first layer (T1) to the total thickness of the second layer and the third layer (T2+T3) be 0.25 or more. When the ratio (T1/(T2+T3)) is 0.25 or more, the sound insulating properties in a high frequency area of 1000 Hz or more, in particular, 2000 Hz or more, can be effectively enhanced, the sound insulating properties in a high frequency area of 2000 Hz or more can be further effectively enhanced, and furthermore, the sound insulating properties in a high frequency area of about 4000 Hz, which have hitherto been difficult to be enhanced, can also be enhanced.

In this connection, even when the ratio (T1/(T2+T3)) is less than 0.25, it is possible to enhance the sound insulating properties in a high frequency area as long as the interlayer film according to the present invention is provided with the Constitution A or the Constitution B. An interlayer film having the ratio (T1/(T2+T3)) of less than 0.25 and being provided with the Constitution A or the Constitution B is higher in sound insulating properties in a high frequency area than an interlayer film having the ratio (T1/(T2+T3)) of less than 0.25 and being provided with neither the Constitution A nor the Constitution B. Moreover, when a comparison is made between two interlayer films which are the same in the ratio (T1/(T2+T3)) and are the same in the glass transition temperatures of the second and third layers, one interlayer film provided with the Constitution A or the Constitution B is higher in sound insulating properties in a high frequency area than the other interlayer film provided with neither the Constitution A nor the Constitution B. Moreover, an interlayer film having the ratio (T1/(T2+T3)) of 0.25 or more and being provided with the Constitution A or the Constitution B is higher in sound insulating properties in a high frequency area than an interlayer film having the ratio (T1/(T2+T3)) of 0.25 or more and being provided with neither the Constitution A nor the Constitution B.

The present inventors have found out that, by combining the constitution in which the glass transition temperature (Tg) of the first layer is lower than the glass transition temperature (Tg) of each of the second layer and the third layer, the constitution in which the ratio (T1/(T2+T3)) is 0.25 or more, and the constitution in which the thickness of an interlayer film is the above lower limit or more, the sound insulating properties in a high frequency area can be further effectively enhanced to the extent hardly attainable by the conventional technique.

From the viewpoint of effectively enhancing the sound insulating properties in a high frequency area, the ratio (T1/(T2+T3)) is more preferably 0.3 or more, preferably 0.65 or less, and more preferably 0.6 or less.

From the viewpoint of effectively enhancing the sound insulating properties in a high frequency area, it is preferred that the interlayer film be provided with the first layer as a layer other than a surface layer (a layer which is not a surface layer) and it is preferred that the interlayer film be provided with the first layer as an intermediate layer. It is preferred that the first layer be a layer which is not used so as to be brought into contact with a lamination glass member.

From the viewpoint of effectively enhancing the adhesivity of an interlayer film to a lamination glass member and the sound insulating properties in a high frequency area, it is preferred that the interlayer film be provided with the second layer as a surface layer.

From the viewpoint of effectively enhancing the sound insulating properties in a high frequency area, it is preferred that the interlayer film have a three or more-layer structure, it is preferred that the interlayer film be provided with a third layer containing a thermoplastic resin, and it is preferred that the third layer be arranged on a second surface side opposite to the first surface of the first layer. From the viewpoint of effectively enhancing the adhesivity of an interlayer film to a lamination glass member and the sound insulating properties in a high frequency area, it is preferred that the interlayer film be provided with the third layer as a surface layer.

Hereinafter, specific embodiments of the present invention will be described with reference to the drawings.

Figure 1:
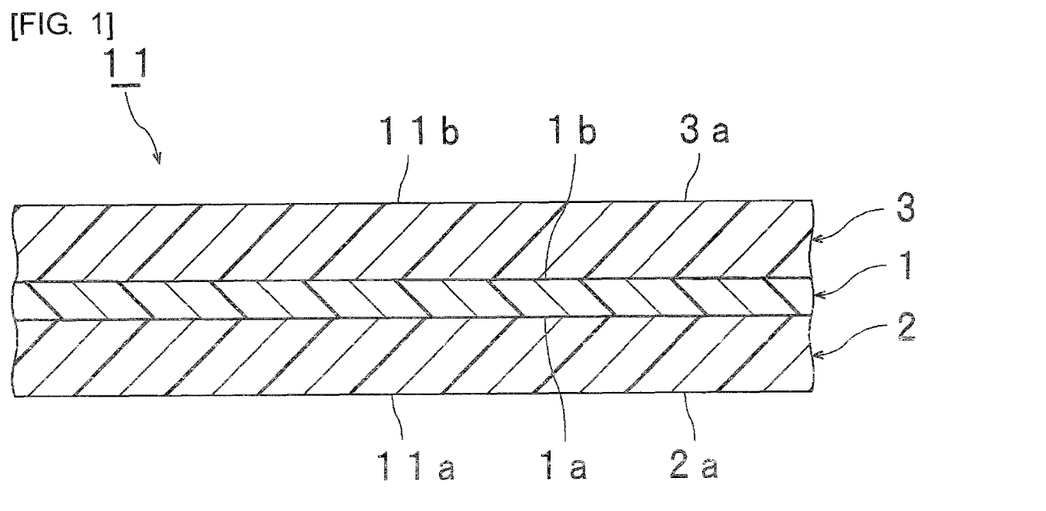
FIG. 1 is a sectional view schematically showing an interlayer film for laminated glass in accordance with a first embodiment of the present invention.

FIG. 1 shows an interlayer film for laminated glass in accordance with a first embodiment of the present invention schematically represented as a sectional view.

An interlayer film 11 shown in FIG. 1 is a multi-layered interlayer film having a three or more-layer structure. The interlayer film 11 is used for obtaining laminated glass. The interlayer film 11 is an interlayer film for laminated glass. The interlayer film 11 is provided with a first layer 1, a second layer 2, and a third layer 3. The second layer 2 is arranged on a first surface 1a of the first layer 1 to be layered thereon. The third layer 3 is arranged on a second surface 1b opposite to the first surface 1a of the first layer 1 to be layered thereon. The first layer 1 is an intermediate layer.

Each of the second layer 2 and the third layer 3 is a protective layer and is a surface layer in the present embodiment. The first layer 1 is arranged between the second layer 2 and the third layer 3 to be sandwiched therebetween. Accordingly, the interlayer film 11 has a multilayer structure (a second layer 2/a first layer 1/a third layer 3) in which the second layer 2, the first layer 1, and the third layer 3 are layered in this order.

In this connection, additional layers may be arranged between the second layer 2 and the first layer 1 and between the first layer 1 and the third layer 3, respectively. It is preferred that each of the second layer 2 and the third layer 3 be directly layered on the first layer 1. Examples of the additional layer include a layer containing polyethylene terephthalate and the like.

Hereinafter, the details of the first layer, the second layer and the third layer which constitute the interlayer film according to the present invention, and the details of each ingredient contained in the first layer, the second layer and the third layer will be described.

(Polyvinyl Acetal Resin or Thermoplastic Resin)

The first layer contains a thermoplastic resin (hereinafter, sometimes described as a thermoplastic resin (1)), and it is preferred that the first layer contain a polyvinyl acetal resin (hereinafter, sometimes described as a polyvinyl acetal resin (1)) as the thermoplastic resin (1). The second layer contains a thermoplastic resin (hereinafter, sometimes described as a thermoplastic resin (2)), and it is preferred that the second layer contain a polyvinyl acetal resin (hereinafter, sometimes described as a polyvinyl acetal resin (2)) as the thermoplastic resin (2). It is preferred that the third layer contain a thermoplastic resin (hereinafter, sometimes described as a thermoplastic resin (3)), and it is preferred that the third layer contain a polyvinyl acetal resin (hereinafter, sometimes described as a polyvinyl acetal resin (3)) as the thermoplastic resin (3). One kind of each of the thermoplastic resin (1), the thermoplastic resin (2), and the thermoplastic resin (3) may be used alone and two or more kinds thereof may be used in combination. The thermoplastic resin (1), the thermoplastic resin (2), and the thermoplastic resin (3) may be the same as or different from one another.

Examples of the thermoplastic resin include a polyvinyl acetal resin, an ethylene-vinyl acetate copolymer resin, an ethylene-acrylic acid copolymer resin, a polyurethane resin, a polyvinyl alcohol resin, and the like. Thermoplastic resins other than these may be used.

For example, the polyvinyl acetal resin can be obtained by acetalizing polyvinyl alcohol (PVA) with an aldehyde. It is preferred that the polyvinyl acetal resin be an acetalized product of polyvinyl alcohol. For example, the polyvinyl alcohol can be obtained by saponifying polyvinyl acetate. The saponification degree of the polyvinyl alcohol generally falls within the range of 70 to 99.9% by mole.

The average polymerization degree of the polyvinyl alcohol (PVA) is preferably 200 or more, more preferably 500 or more, even more preferably 1500 or more, further preferably 1600 or more, especially preferably 2600 or more, most preferably 2700 or more, and preferably 5000 or less, more preferably 4000 or less and further preferably 3500 or less. When the average polymerization degree is the above lower limit or more, the penetration resistance of laminated glass is further enhanced. When the average polymerization degree is the above upper limit or less, formation of an interlayer film is facilitated.

The average polymerization degree of the polyvinyl alcohol is determined by a method in accordance with JIS K6726 "Testing methods for polyvinyl alcohol".

It is preferred that the number of carbon atoms of the acetal group in the polyvinyl acetal resin lie within the range of 3 to 5, and it is preferred that the number of carbon atoms of the acetal group be 4 or 5.

In general, as the aldehyde, an aldehyde with 1 to 10 carbon atoms is suitably used. Examples of the aldehyde with 1 to 10 carbon atoms include formaldehyde, acetaldehyde, propionaldehyde, n-butyraldehyde, isobutyraldehyde, n-valeraldehyde, 2-ethylbutyraldehyde, n-hexylaldehyde, n-octylaldehyde, n-nonylaldehyde, n-decylaldehyde, benzaldehyde, and the like. Acetaldehyde, propionaldehyde, n-butyraldehyde, isobutyraldehyde, n-hexylaldehyde, or n-valeraldehyde is preferred, acetaldehyde, propionaldehyde, n-butyraldehyde, isobutyraldehyde, or n-valeraldehyde is more preferred, and n-butyraldehyde or n-valeraldehyde is further preferred. One kind of the aldehyde may be used alone and two or more kinds thereof may be used in combination.

The content of the hydroxyl group (the amount of hydroxyl groups) of the polyvinyl acetal resin (1) is preferably 17% by mole or more, more preferably 20% by mole or more, further preferably 22% by mole or more, and preferably 30% by mole or less, more preferably 28% by mole or less, even more preferably 27% by mole or less, further preferably 25% by mole or less, and especially preferably 24% by mole or less. When the content of the hydroxyl group is the above lower limit or more, the mechanical strength of the interlayer film is further enhanced. In particular, when the content of the hydroxyl group of the polyvinyl acetal resin (1) is 20% by mole or more, the resin is high in reaction efficiency and is excellent in productivity, moreover, when being 30% by mole or less, the sound insulating properties of laminated glass are further enhanced, and when being 28% by mole or less, the sound insulating properties are still further enhanced. Moreover, when the content of the hydroxyl group is the above upper limit or less, the flexibility of the interlayer film is enhanced and the handling of the interlayer film is facilitated.

The content of the hydroxyl group of each of the polyvinyl acetal resin (2) and the polyvinyl acetal resin (3) is preferably 25% by mole or more, more preferably 28% by mole or more, more preferably 30% by mole or more, even more preferably 31.5% by mole or more, further preferably 32% by mole or more, especially preferably 33% by mole or more, and preferably 37% by mole or less, more preferably 36.5% by mole or less, and further preferably 36% by mole or less. When the content of the hydroxyl group is the above lower limit or more, the adhesive force of the interlayer film is further enhanced. Moreover, when the content of the hydroxyl group is the above upper limit or less, the flexibility of the interlayer film is enhanced and the handling of the interlayer film is facilitated.

From the viewpoint of further enhancing the sound insulating properties, it is preferred that the content of the hydroxyl group of the polyvinyl acetal resin (1) be lower than the content of the hydroxyl group of the polyvinyl acetal resin (2) and it is preferred that the content of the hydroxyl group of the polyvinyl acetal resin (1) be lower than the content of the hydroxyl group of the polyvinyl acetal resin (3). From the viewpoint of still further enhancing the sound insulating properties, each of the absolute value of the difference between the content of the hydroxyl group of the polyvinyl acetal resin (1) and the content of the hydroxyl group of the polyvinyl acetal resin (2) and the absolute value of the difference between the content of the hydroxyl group of the polyvinyl acetal resin (1) and the content of the hydroxyl group of the polyvinyl acetal resin (3) is preferably 1% by mole or more, more preferably 5% by mole or more, further preferably 9% by mole or more, especially preferably 10% by mole or more, and most preferably 12% by mole or more. Each of the absolute value of the difference between the content of the hydroxyl group of the polyvinyl acetal resin (1) and the content of the hydroxyl group of the polyvinyl acetal resin (2) and the absolute value of the difference between the content of the hydroxyl group of the polyvinyl acetal resin (1) and the content of the hydroxyl group of the polyvinyl acetal resin (3) is preferably 20% by mole or less.

The content of the hydroxyl group of the polyvinyl acetal resin is a mole fraction, represented in percentage, obtained by dividing the amount of ethylene groups to which the hydroxyl group is bonded by the total amount of ethylene groups in the main chain. For example, the amount of ethylene groups to which the hydroxyl group is bonded can be measured in accordance with JIS K6728 "Testing methods for polyvinyl butyral".

The acetylation degree (the amount of acetyl groups) of the polyvinyl acetal resin (1) is preferably 0.01% by mole or more, more preferably 0.1% by mole or more, even more preferably 7% by mole or more, further preferably 9% by mole or more, preferably 30% by mole or less, more preferably 25% by mole or less, and further preferably 24% by mole or less. When the acetylation degree is the above lower limit or more, the compatibility between the polyvinyl acetal resin and a plasticizer is enhanced. When the acetylation degree is the above upper limit or less, with regard to the interlayer film and laminated glass, the moisture resistance thereof is enhanced. In particular, when the acetylation degree of the polyvinyl acetal resin (1) is 0.1% by mole or more and 25% by mole or less, the resulting laminated glass is further excellent in penetration resistance.

The acetylation degree of each of the polyvinyl acetal resin (2) and the polyvinyl acetal resin (3) is preferably 0.01% by mole or more, more preferably 0.5% by mole or more, and preferably 10% by mole or less, and more preferably 2% by mole or less. When the acetylation degree is the above lower limit or more, the compatibility between the polyvinyl acetal resin and a plasticizer is enhanced. When the acetylation degree is the above upper limit or less, with regard to the interlayer film and laminated glass, the moisture resistance thereof is enhanced.

The acetylation degree is a mole fraction, represented in percentage, obtained by dividing the amount of ethylene groups to which the acetyl group is bonded by the total amount of ethylene groups in the main chain. For example, the amount of ethylene groups to which the acetyl group is bonded can be measured in accordance with JIS K6728 "Testing methods for polyvinyl butyral".

The acetalization degree of the polyvinyl acetal resin (1) (the butyralization degree in the case of a polyvinyl butyral resin) is preferably 47% by mole or more, more preferably 60% by mole or more, and preferably 85% by mole or less, more preferably 80% by mole or less and further preferably 75% by mole or less. When the acetalization degree is the above lower limit or more, the compatibility between the polyvinyl acetal resin and a plasticizer is enhanced. When the acetalization degree is the above upper limit or less, the reaction time required for producing the polyvinyl acetal resin is shortened.

The acetalization degree of each of the polyvinyl acetal resin (2) and the polyvinyl acetal resin (3) (the butyralization degree in the case of a polyvinyl butyral resin) is preferably 55% by mole or more, more preferably 60% by mole or more, and preferably 75% by mole or less and more preferably 71% by mole or less. When the acetalization degree is the above lower limit or more, the compatibility between the polyvinyl acetal resin and a plasticizer is enhanced. When the acetalization degree is the above upper limit or less, the reaction time required for producing the polyvinyl acetal resin is shortened.

The acetalization degree is a mole fraction, represented in percentage, obtained by dividing a value obtained by subtracting the amount of ethylene groups to which the hydroxyl group is bonded and the amount of ethylene groups to which the acetyl group is bonded from the total amount of ethylene groups in the main chain by the total amount of ethylene groups in the main chain.

In this connection, it is preferred that the content of the hydroxyl group (the amount of hydroxyl groups), the acetalization degree (the butyralization degree) and the acetylation degree be calculated from the results measured by a method in accordance with JIS K6728 "Testing methods for polyvinyl butyral". In this context, a method in accordance with ASTM D1396-92 may be used. When the polyvinyl acetal resin is a polyvinyl butyral resin, the content of the hydroxyl group (the amount of hydroxyl groups), the acetalization degree (the butyralization degree) and the acetylation degree can be calculated from the results measured by a method in accordance with JIS K6728 "Testing methods for polyvinyl butyral".

From the viewpoint of further improving the penetration resistance of laminated glass, it is preferred that the polyvinyl acetal resin (1) be a polyvinyl acetal resin (A) with an acetylation degree (a) of less than 8% by mole and an acetalization degree (a) of 65% by mole or more or a polyvinyl acetal resin (B) with an acetylation degree (b) of 8% by mole or more. Each of the polyvinyl acetal resin (2) and the polyvinyl acetal resin (3) may be the polyvinyl acetal resin (A) and may be the polyvinyl acetal resin (B).

The acetylation degree (a) of the polyvinyl acetal resin (A) is less than 8% by mole, preferably 7.9% by mole or less, more preferably 7.8% by mole or less, further preferably 6.5% by mole or less, especially preferably 6% by mole or less, and preferably 0.1% by mole or more, more preferably 0.5% by mole or more, further preferably 5% by mole or more, and especially preferably 5.5% by mole or more. When the acetylation degree (a) is 0.1% by mole or more and less than 8% by mole, the transfer of a plasticizer can be easily controlled and the sound insulating properties of laminated glass are further enhanced.

The acetalization degree (a) of the polyvinyl acetal resin (A) is 65% by mole or more, preferably 66% by mole or more, more preferably 67% by mole or more, further preferably 67.5% by mole or more, especially preferably 75% by mole or more, and preferably 85% by mole or less, more preferably 84% by mole or less, further preferably 83% by mole or less and especially preferably 82% by mole or less. When the acetalization degree (a) is the above lower limit or more, the sound insulating properties of laminated glass are further enhanced. When the acetalization degree (a) is the above upper limit or less, the reaction time required for producing the polyvinyl acetal resin (A) can be shortened.

The content (a) of the hydroxyl group of the polyvinyl acetal resin (A) is preferably 18% by mole or more, more preferably 19% by mole or more, further preferably 20% by mole or more, especially preferably 21% by mole or more, most preferably 23% by mole or more, and preferably 31% by mole or less, more preferably 30% by mole or less, further preferably 29% by mole or less, and especially preferably 28% by mole or less. When the content (a) of the hydroxyl group is the above lower limit or more, the adhesive force of the second layer or the third layer to the first layer is further enhanced when the second layer or the third layer is directly layered on the first layer. When the content (a) of the hydroxyl group is the above upper limit or less, the sound insulating properties of laminated glass are further enhanced.

The acetylation degree (b) of the polyvinyl acetal resin (B) is 8% by mole or more, preferably 9% by mole or more, more preferably 9.5% by mole or more, further preferably 10% by mole or more, especially preferably 10.5% by mole or more, and preferably 30% by mole or less, more preferably 28% by mole or less, further preferably 26% by mole or less and especially preferably 24% by mole or less. When the acetylation degree (b) is the above lower limit or more, the sound insulating properties of laminated glass are further enhanced. When the acetylation degree (b) is the above upper limit or less, the reaction time required for producing the polyvinyl acetal resin (B) can be shortened.

The acetalization degree (b) of the polyvinyl acetal resin (B) is preferably 50% by mole or more, more preferably 53% by mole or more, further preferably 55% by mole or more, especially preferably 60% by mole or more, and preferably 78% by mole or less, more preferably 75% by mole or less, further preferably 72% by mole or less and especially preferably 70% by mole or less. When the acetalization degree (b) is the above lower limit or more, the sound insulating properties of laminated glass are further enhanced. When the acetalization degree (b) is the above upper limit or less, the reaction time required for producing the polyvinyl acetal resin (B) can be shortened.

The content (b) of the hydroxyl group of the polyvinyl acetal resin (B) is preferably 18% by mole or more, more preferably 19% by mole or more, further preferably 20% by mole or more, especially preferably 21% by mole or more, most preferably 23% by mole or more, and preferably 31% by mole or less, more preferably 30% by mole or less, further preferably 29% by mole or less, and especially preferably 28% by mole or less. When the content (b) of the hydroxyl group is the above lower limit or more, the adhesive force of the second layer or the third layer to the first layer is further enhanced when the second layer or the third layer is directly layered on the first layer. When the content (b) of the hydroxyl group is the above upper limit or less, the sound insulating properties of laminated glass are further enhanced.

It is preferred that each of the polyvinyl acetal resin (A) and the polyvinyl acetal resin (B) be a polyvinyl butyral resin.

(Plasticizer)

It is preferred that the first layer contain a plasticizer (hereinafter, sometimes described as a plasticizer (1)). It is preferred that the second layer contain a plasticizer (hereinafter, sometimes described as a plasticizer (2)). It is preferred that the third layer contain a plasticizer (hereinafter, sometimes described as a plasticizer (3)). By the use of the plasticizer, and furthermore, by using a polyvinyl acetal resin and a plasticizer together, the adhesive force of a layer containing the polyvinyl acetal resin and the plasticizer to a lamination glass member or another layer is moderately enhanced. The plasticizer is not particularly limited. The plasticizer (1), the plasticizer (2), and the plasticizer (3) may be the same as or different from one another. One kind of each of the plasticizer (1), the plasticizer (2), and the plasticizer (3) may be used alone and two or more kinds thereof may be used in combination.

Examples of the plasticizer include organic ester plasticizers such as a monobasic organic acid ester and a polybasic organic acid ester, organic phosphate plasticizers such as an organic phosphate plasticizer and an organic phosphite plasticizer, and the like. Organic ester plasticizers are preferred. It is preferred that the plasticizer be a liquid plasticizer.

Examples of the monobasic organic acid ester include a glycol ester obtained by the reaction of a glycol with a monobasic organic acid, and the like. Examples of the glycol include triethylene glycol, tetraethylene glycol, tripropylene glycol, and the like. Examples of the monobasic organic acid include butyric acid, isobutyric acid, caproic acid, 2-ethylbutyric acid, heptanoic acid, n-octylic acid, 2-ethylhexanoic acid, n-nonylic acid, decanoic acid, and the like.

Examples of the polybasic organic acid ester include an ester compound of a polybasic organic acid and an alcohol having a linear or branched structure of 4 to 8 carbon atoms. Examples of the polybasic organic acid include adipic acid, sebacic acid, azelaic acid, and the like.

Examples of the organic ester plasticizer include triethylene glycol di-2-ethylpropanoate, triethylene glycol di-2-ethylbutyrate, triethylene glycol di-2-ethylhexanoate, triethylene glycol dicaprylate, triethylene glycol di-n-octanoate, triethylene glycol di-n-heptanoate, tetraethylene glycol di-n-heptanoate, dibutyl sebacate, dioctyl azelate, dibutyl carbitol adipate, ethylene glycol di-2-ethylbutyrate, 1,3-propylene glycol di-2-ethylbutyrate, 1,4-butylene glycol di-2-ethylbutyrate, diethylene glycol di-2-ethylbutyrate, diethylene glycol di-2-ethylhexanoate, dipropylene glycol di-2-ethylbutyrate, triethylene glycol di-2-ethylpentanoate, tetraethylene glycol di-2-ethylbutyrate, diethylene glycol dicaprylate, dihexyl adipate, dioctyl adipate, hexyl cyclohexyl adipate, a mixture of heptyl adipate and nonyl adipate, diisononyl adipate, diisodecyl adipate, heptyl nonyl adipate, dibutyl sebacate, oil-modified sebacic alkyds, a mixture of a phosphoric acid ester and an adipic acid ester, and the like. Organic ester plasticizers other than these may be used. Other adipic acid esters other than the above-described adipic acid esters may be used.

Examples of the organic phosphate plasticizer include tributoxyethyl phosphate, isodecyl phenyl phosphate, triisopropyl phosphate, and the like.

It is preferred that the plasticizer be a diester plasticizer represented by the following formula (1).

[Chemical 1]

(1)

In the foregoing formula (1), R1 and R2 each represent an organic group with 2 to 10 carbon atoms, R3 represents an ethylene group, an isopropylene group or an n-propylene group, and p represents an integer of 3 to 10. It is preferred that R1 and R2 in the foregoing formula (1) each be an organic group with 5 to 10 carbon atoms, and it is more preferred that R1 and R2 each be an organic group with 6 to 10 carbon atoms.

It is preferred that the plasticizer include triethylene glycol di-2-ethylhexanoate (3GO), triethylene glycol di-2-ethylbutyrate (3GH), or triethylene glycol di-2-ethylpropanoate, it is more preferred that the plasticizer include triethylene glycol di-2-ethylhexanoate or triethylene glycol di-2-ethylbutyrate, and it is further preferred that the plasticizer include triethylene glycol di-2-ethylhexanoate.

Each of the content of the plasticizer (2) (hereinafter, sometimes described as the content (2)) relative to 100 parts by weight of the thermoplastic resin (2) (100 parts by weight a polyvinyl acetal resin (2) when the thermoplastic resin (2) is the polyvinyl acetal resin (2)) and the content of the plasticizer (3) (hereinafter, sometimes described as the content (3)) relative to 100 parts by weight of the thermoplastic resin (3) (100 parts by weight a polyvinyl acetal resin (3) when the thermoplastic resin (3) is the polyvinyl acetal resin (3)) is preferably 10 parts by weight or more, more preferably 15 parts by weight or more, and preferably 40 parts by weight or less, more preferably 35 parts by weight or less, further preferably 32 parts by weight or less, and especially preferably 30 parts by weight or less. When the content (2) and the content (3) are the above lower limit or more, the flexibility of the interlayer film is enhanced and the handling of the interlayer film is facilitated. When the content (2) and the content (3) are the above upper limit or less, the penetration resistance is further enhanced.

The content of the plasticizer (1) (hereinafter, sometimes described as the content (1)) relative to 100 parts by weight of the polyvinyl acetal resin (1) is preferably 50 parts by weight or more, more preferably 55 parts by weight or more, further preferably 60 parts by weight or more, and preferably 90 parts by weight or less, more preferably 85 parts by weight or less, and further preferably 80 parts by weight or less. When the content (1) is the above lower limit or more, the flexibility of the interlayer film is enhanced and the handling of the interlayer film is facilitated. When the content (1) is the above upper limit or less, the penetration resistance of laminated glass is further enhanced.

For the purpose of further enhancing the sound insulating properties of laminated glass, it is preferred that the content (1) be larger than the content (2) and it is preferred that the content (1) be larger than the content (3).

In particular, from the viewpoint of further enhancing the sound insulating properties of laminated glass, each of the absolute value of the difference between the content (2) and the content (1) and the absolute value of the difference between the content (3) and the content (1) is preferably 10 parts by weight or more, more preferably 15 parts by weight or more, and further preferably 20 parts by weight or more. Each of the absolute value of the difference between the content (2) and the content (1) and the absolute value of the difference between the content (3) and the content (1) is preferably 80 parts by weight or less, more preferably 75 parts by weight or less, and further preferably 70 parts by weight or less.

(Heat Shielding Compound)

It is preferred that the interlayer film include a heat shielding compound. It is preferred that the first layer contain a heat shielding compound. It is preferred that the second layer contain a heat shielding compound. It is preferred that the third layer contain a heat shielding compound. One kind of the heat shielding compound may be used alone, and two or more kinds thereof may be used in combination.

Ingredient X:

It is preferred that the interlayer film include at least one kind of Ingredient X among a phthalocyanine compound, a naphthalocyanine compound and an anthracyanine compound. It is preferred that the first layer contain the Ingredient X. It is preferred that the second layer contain the Ingredient X. It is preferred that the third layer contain the Ingredient X. The Ingredient X is a heat shielding compound. One kind of the Ingredient X may be used alone, and two or more kinds thereof may be used in combination.

The Ingredient X is not particularly limited. As the Ingredient X, conventionally known phthalocyanine compound, naphthalocyanine compound and anthracyanine compound can be used.

With regard to the interlayer film and laminated glass, from the viewpoint of further enhancing the heat shielding properties thereof, it is preferred that the Ingredient X be at least one kind selected from the group consisting of phthalocyanine, a derivative of phthalocyanine, naphthalocyanine and a derivative of naphthalocyanine, and it is more preferred that the Ingredient X be at least one kind among phthalocyanine and a derivative of phthalocyanine.

From the viewpoints of effectively enhancing the heat shielding properties and maintaining the visible light transmittance at a higher level over a long period of time, it is preferred that the Ingredient X contain vanadium atoms or copper atoms. It is preferred that the Ingredient X contain vanadium atoms and it is also preferred that the Ingredient X contain copper atoms. It is more preferred that the Ingredient X be at least one kind among phthalocyanine containing vanadium atoms or copper atoms and a derivative of phthalocyanine containing vanadium atoms or copper atoms. With regard to the interlayer film and laminated glass, from the viewpoint of still further enhancing the heat shielding properties thereof, it is preferred that the Ingredient X have a structural unit in which an oxygen atom is bonded to a vanadium atom.

In 100% by weight of a layer containing the Ingredient X (a first layer, a second layer or a third layer), the content of the Ingredient X is preferably 0.001% by weight or more, more preferably 0.005% by weight or more, further preferably 0.01% by weight or more, especially preferably 0.02% by weight or more, and preferably 0.2% by weight or less, more preferably 0.1% by weight or less, further preferably 0.05% by weight or less and especially preferably 0.04% by weight or less. When the content of the Ingredient X is the above lower limit or more and the above upper limit or less, the heat shielding properties are sufficiently enhanced and the visible light transmittance is sufficiently enhanced. For example, it is possible to make the visible light transmittance 70% or more.

Heat Shielding Particles:

It is preferred that the interlayer film include heat shielding particles. It is preferred that the first layer contain the heat shielding particles. It is preferred that the second layer contain the heat shielding particles. It is preferred that the third layer contain the heat shielding particles. The heat shielding particle is of a heat shielding compound. By the use of heat shielding particles, infrared rays (heat rays) can be effectively cut off. One kind of the heat shielding particles may be used alone, and two or more kinds thereof may be used in combination.

From the viewpoint of further enhancing the heat shielding properties of laminated glass, it is more preferred that the heat shielding particles be metal oxide particles. It is preferred that the heat shielding particle be a particle (a metal oxide particle) formed from an oxide of a metal.

The energy amount of an infrared ray with a wavelength of 780 nm or longer which is longer than that of visible light is small as compared with an ultraviolet ray. However, the thermal action of infrared rays is large, and when infrared rays are absorbed into a substance, heat is released from the substance. As such, infrared rays are generally called heat rays. By the use of the heat shielding particles, infrared rays (heat rays) can be effectively cut off. In this connection, the heat shielding particle means a particle capable of absorbing infrared rays.

Specific examples of the heat shielding particles include metal oxide particles such as aluminum-doped tin oxide particles, indium-doped tin oxide particles, antimony-doped tin oxide particles (ATO particles), gallium-doped zinc oxide particles (GZO particles), indium-doped zinc oxide particles (IZO particles), aluminum-doped zinc oxide particles (AZO particles), niobium-doped titanium oxide particles, sodium-doped tungsten oxide particles, cesium-doped tungsten oxide particles, thallium-doped tungsten oxide particles, rubidium-doped tungsten oxide particles, tin-doped indium oxide particles (ITO particles), tin-doped zinc oxide particles and silicon-doped zinc oxide particles, lanthanum hexaboride ($LaB_6$) particles, and the like. Heat shielding particles other than these may be used. Since the heat ray shielding function is high, preferred are metal oxide particles, more preferred are ATO particles, GZO particles, IZO particles, ITO particles or tungsten oxide particles, and especially preferred are ITO particles or tungsten oxide particles. In particular, since the heat ray shielding function is high and the particles are readily available, preferred are tin-doped indium oxide particles (ITO particles), and also preferred are tungsten oxide particles.

With regard to the interlayer film and laminated glass, from the viewpoint of further enhancing the heat shielding properties thereof, it is preferred that the tungsten oxide particles be metal-doped tungsten oxide particles. Examples of the "tungsten oxide particles" include metal-doped tungsten oxide particles. Specifically, examples of the metal-doped tungsten oxide particles include sodium-doped tungsten oxide particles, cesium-doped tungsten oxide particles, thallium-doped tungsten oxide particles, rubidium-doped tungsten oxide particles, and the like.

With regard to the interlayer film and laminated glass, from the viewpoint of further enhancing the heat shielding properties thereof, cesium-doped tungsten oxide particles are especially preferred. With regard to the interlayer film and laminated glass, from the viewpoint of still further enhancing the heat shielding properties thereof, it is preferred that the cesium-doped tungsten oxide particles be tungsten oxide particles represented by the formula: $Cs_{0.33}WO_3$.

The average particle diameter of the heat shielding particles is preferably 0.01 µm or more, more preferably 0.02 µm or more, and preferably 0.1 µm or less and more preferably 0.05 µm or less. When the average particle diameter is the above lower limit or more, the heat ray shielding properties are sufficiently enhanced. When the average particle diameter is the above upper limit or less, the dispersibility of heat shielding particles is enhanced.

The "average particle diameter" refers to the volume average particle diameter. The average particle diameter can be measured using a particle size distribution measuring apparatus ("UPA-EX150" available from NIKKISO CO., LTD.), or the like.

In 100% by weight of a layer containing the heat shielding particles (a first layer, a second layer or a third layer), each content of the heat shielding particles is preferably 0.01% by weight or more, more preferably 0.1% by weight or more, further preferably 1% by weight or more, especially preferably 1.5% by weight or more, and preferably 6% by weight or less, more preferably 5.5% by weight or less, further preferably 4% by weight or less, especially preferably 3.5% by weight or less and most preferably 3% by weight or less. When the content of the heat shielding particles is the above lower limit or more and the above upper limit or less, the heat shielding properties are sufficiently enhanced and the visible light transmittance is sufficiently enhanced.

(Metal Salt)

It is preferred that the interlayer film include at least one kind of metal salt (hereinafter, sometimes described as Metal salt M) among an alkali metal salt, an alkaline earth metal salt, and an Mg salt. It is preferred that the first layer contain the Metal salt M. It is preferred that the second layer contain the Metal salt M. It is preferred that the surface layer contain the Metal salt M. By the use of the Metal salt M, controlling the adhesivity between the interlayer film and a lamination glass member or the adhesivity between respective layers in the interlayer film is facilitated. One kind of the Metal salt M may be used alone and two or more kinds thereof may be used in combination.

It is preferred that the Metal salt M contain at least one kind of metal selected from the group consisting of Li, Na, K, Rb, Cs, Mg, Ca, Sr, and Ba. It is preferred that the metal salt contained in the interlayer film contain at least one kind of metal between K and Mg.

Moreover, it is more preferred that the Metal salt M be an alkali metal salt of an organic acid with 2 to 16 carbon atoms, an alkaline earth metal salt of an organic acid with 2 to 16 carbon atoms, and an Mg salt of an organic acid with 2 to 16 carbon atoms, and it is further preferred that the Metal salt M be a magnesium carboxylate with 2 to 16 carbon atoms or a potassium carboxylate with 2 to 16 carbon atoms.

Although the magnesium carboxylate with 2 to 16 carbon atoms and the potassium carboxylate with 2 to 16 carbon atoms are not particularly limited, examples thereof include magnesium acetate, potassium acetate, magnesium propionate, potassium propionate, magnesium 2-ethylbutyrate, potassium 2-ethylbutanoate, magnesium 2-ethylhexanoate, potassium 2-ethylhexanoate, and the like.

The total of the contents of Mg and K in a layer containing the Metal salt M (a first layer, a second layer, or a third layer) is preferably 5 ppm or more, more preferably 10 ppm or more, further preferably 20 ppm or more, and preferably 300 ppm or less, more preferably 250 ppm or less, and further preferably 200 ppm or less. When the total of the contents of Mg and K is the above lower limit or more and the above upper limit or less, the adhesivity between the interlayer film and a lamination glass member or the adhesivity between respective layers in the interlayer film can be further well controlled.

(Ultraviolet Ray Screening Agent)

It is preferred that the interlayer film include an ultraviolet ray screening agent. It is preferred that the first layer contain an ultraviolet ray screening agent. It is preferred that the second layer contain an ultraviolet ray screening agent. It is preferred that the third layer contain an ultraviolet ray screening agent. By the use of an ultraviolet ray screening agent, even when the interlayer film and the laminated glass are used for a long period of time, the visible light transmittance becomes further difficult to be lowered. One kind of the ultraviolet ray screening agent may be used alone, and two or more kinds thereof may be used in combination.

Examples of the ultraviolet ray screening agent include an ultraviolet ray absorber. It is preferred that the ultraviolet ray screening agent be an ultraviolet ray absorber.

Examples of the ultraviolet ray screening agent include an ultraviolet ray screening agent containing a metal atom, an ultraviolet ray screening agent containing a metal oxide, an ultraviolet ray screening agent having a benzotriazole structure, an ultraviolet ray screening agent having a benzophenone structure, an ultraviolet ray screening agent having a triazine structure, an ultraviolet ray screening agent having a malonic acid ester structure, an ultraviolet ray screening agent having an oxanilide structure, an ultraviolet ray screening agent having a benzoate structure, and the like.

Examples of the ultraviolet ray screening agent containing a metal atom include platinum particles, particles in which the surface of platinum particles is coated with silica, palladium particles, particles in which the surface of palladium particles is coated with silica, and the like. It is preferred that the ultraviolet ray screening agent not be heat shielding particles.

The ultraviolet ray screening agent is preferably an ultraviolet ray screening agent having a benzotriazole structure, an ultraviolet ray screening agent having a benzophenone structure, an ultraviolet ray screening agent having a triazine structure or an ultraviolet ray screening agent having a benzoate structure, more preferably an ultraviolet ray screening agent having a benzotriazole structure or an ultraviolet ray screening agent having a benzophenone structure, and further preferably an ultraviolet ray screening agent having a benzotriazole structure.

Examples of the ultraviolet ray screening agent containing a metal oxide include zinc oxide, titanium oxide, cerium oxide, and the like. Furthermore, with regard to the ultraviolet ray screening agent containing a metal oxide, the surface thereof may be coated with any material. Examples of the coating material for the surface of the ultraviolet ray screening agent containing a metal oxide include an insulating metal oxide, a hydrolyzable organosilicon compound, a silicone compound, and the like.

Examples of the ultraviolet ray screening agent having a benzotriazole structure include ultraviolet ray screening agents having a benzotriazole structure such as 2-(2'-hydroxy-5'-methylphenyl)benzotriazole ("Tinuvin P" available from BASF Japan Ltd.), 2-(2'-hydroxy-3',5'-di-t-butylphenyl)benzotriazole ("Tinuvin 320" available from BASF Japan Ltd.), 2-(2'-hydroxy-3'-t-butyl-5-methylphenyl)-5-chlorobenzotriazole ("Tinuvin 326" available from BASF Japan Ltd.) and 2-(2'-hydroxy-3',5'-di-amylphenyl)benzotriazole ("Tinuvin 328" available from BASF Japan Ltd.). It is preferred that the ultraviolet ray screening agent be an ultraviolet ray screening agent having a benzotriazole structure containing a halogen atom, and it is more preferred that the ultraviolet ray screening agent be an ultraviolet ray screening agent having a benzotriazole structure containing a chlorine atom, because those are excellent in ultraviolet ray absorbing performance.

Examples of the ultraviolet ray screening agent having a benzophenone structure include octabenzone ("Chimassorb 81" available from BASF Japan Ltd.), and the like.

Examples of the ultraviolet ray screening agent having a triazine structure include "LA-F70" available from ADEKA CORPORATION, 2-(4,6-diphenyl-1,3,5-triazine-2-yl)-5-[(hexyl)oxy]-phenol ("Tinuvin 1577FF" available from BASF Japan Ltd.), and the like.

Examples of the ultraviolet ray screening agent having a malonic acid ester structure include dimethyl(p-methoxybenzylidene)malonate, tetraethyl-2,2-(1,4-phenylenedimethylidene)bismalonate, 2-(p-methoxybenzylidene)-bis(1,2,2,6,6-pentamethyl-4-piperidinyl)malonate, and the like.

Examples of a commercial product of the ultraviolet ray screening agent having a malonic acid ester structure include Hostavin B-CAP, Hostavin PR-25 and Hostavin PR-31 (any of these is available from Clariant Japan K.K.).

Examples of the ultraviolet ray screening agent having an oxanilide structure include a kind of oxalic acid diamide having a substituted aryl group and the like on the nitrogen atom such as N-(2-ethylphenyl)-N'-(2-ethoxy-5-t-butylphenyl)oxalic acid diamide, N-(2-ethylphenyl)-N'-(2-ethoxyphenyl) oxalic acid diamide and 2-ethyl-2'-ethoxy-oxanilide ("Sanduvor VSU" available from Clariant Japan K.K.).

Examples of the ultraviolet ray screening agent having a benzoate structure include 2,4-di-tert-butylphenyl-3,5-di-tert-butyl-4-hydroxybenzoate ("Tinuvin 120" available from BASF Japan Ltd.), and the like.

From the viewpoint of further suppressing the lowering in visible light transmittance after the lapse of a certain period of time, in 100% by weight of a layer containing the ultraviolet ray screening agent (a first layer, a second layer or a third layer), the content of the ultraviolet ray screening agent is preferably 0.1% by weight or more, more preferably 0.2% by weight or more, further preferably 0.3% by weight or more, especially preferably 0.5% by weight or more, and preferably 2.5% by weight or less, more preferably 2% by weight or less, further preferably 1% by weight or less and especially preferably 0.8% by weight or less. In particular, by setting the content of the ultraviolet ray screening agent to be 0.2% by weight or more in 100% by weight of a layer containing the ultraviolet ray screening agent, with regard to the interlayer film and laminated glass, the lowering in visible light transmittance thereof after the lapse of a certain period of time can be significantly suppressed.

(Oxidation Inhibitor)

It is preferred that the interlayer film include an oxidation inhibitor. It is preferred that the first layer contain an oxidation inhibitor. It is preferred that the second layer contain an oxidation inhibitor. It is preferred that the third layer contain an oxidation inhibitor. One kind of the oxidation inhibitor may be used alone, and two or more kinds thereof may be used in combination.

Examples of the oxidation inhibitor include a phenol-based oxidation inhibitor, a sulfur-based oxidation inhibitor, a phosphorus-based oxidation inhibitor, and the like. The phenol-based oxidation inhibitor is an oxidation inhibitor having a phenol skeleton. The sulfur-based oxidation inhibitor is an oxidation inhibitor containing a sulfur atom. The phosphorus-based oxidation inhibitor is an oxidation inhibitor containing a phosphorus atom.

It is preferred that the oxidation inhibitor be a phenol-based oxidation inhibitor or a phosphorus-based oxidation inhibitor.

Examples of the phenol-based oxidation inhibitor include 2,6-di-t-butyl-p-cresol (BHT), butyl hydroxyanisole (BHA), 2,6-di-t-butyl-4-ethylphenol, stearyl β-(3,5-di-t-butyl-4-hydroxyphenyl)propionate, 2,2'-methylenebis-(4-methyl-6-butylphenol), 2,2'-methylenebis-(4-ethyl-6-t-butylphenol), 4,4'-butylidene-bis-(3-methyl-6-t-butylphenol), 1,1,3-tris-(2-methyl-hydroxy-5-t-butylphenyl)butane, tetrakis[methylene-3-(3',5'-butyl-4-hydroxyphenyl)propionate]methane, 1,3,3-tris-(2-methyl-4-hydroxy-5-t-butylphenol)butane, 1,3,5-trimethyl-2,4,6-tris(3,5-di-t-butyl-4-hydroxybenzyl)benzene, bis(3,3'-t-butylphenol)butyric acid glycol ester, bis(3-t-butyl-4-hydroxy-5-methylbenzenepropanoic acid) ethylenebis(oxyethylene), and the like. One kind or two or more kinds among these oxidation inhibitors are suitably used.

Examples of the phosphorus-based oxidation inhibitor include tridecyl phosphite, tris(tridecyl) phosphite, triphenyl phosphite, trinonylphenyl phosphite, bis(tridecyl)pentaerithritol diphosphite, bis(decyl)pentaerithritol diphosphite, tris(2,4-di-t-butylphenyl) phosphite, bis(2,4-di-t-butyl-6- methylphenyl)ethyl ester phosphorous acid, tris(2,4-di-t-butylphenyl) phosphite, 2,2'-methylenebis(4,6-di-t-butyl-1-phenyloxy)(2-ethylhexyloxy)phosphorus, and the like. One kind or two or more kinds among these oxidation inhibitors are suitably used.

Examples of a commercial product of the oxidation inhibitor include "IRGANOX 245" available from BASF Japan Ltd., "IRGAFOS 168" available from BASF Japan Ltd., "IRGAFOS 38" available from BASF Japan Ltd., "Sumilizer BHT" available from Sumitomo Chemical Co., Ltd., "IRGANOX 1010" available from BASF Japan Ltd., and the like.

With regard to the interlayer film and laminated glass, in order to maintain high visible light transmittance thereof over a long period of time, it is preferred that the content of the oxidation inhibitor be 0.1% by weight or more in 100% by weight of the interlayer film or in 100% by weight of the layer containing the oxidation inhibitor (a first layer, a second layer or a third layer). Moreover, since an effect commensurate with the addition of an oxidation inhibitor is not attained, it is preferred that the content of the oxidation inhibitor be 2% by weight or less in 100% by weight of the interlayer film or in 100% by weight of the layer containing the oxidation inhibitor.

(Other Ingredients)

Each of the first layer, the second layer, and the third layer may contain additives such as a coupling agent containing silicon, aluminum, or titanium, a dispersing agent, a surfactant, a flame retardant, an antistatic agent, a pigment, a dye, a moisture-resistance improving agent, a fluorescent brightening agent, and an infrared ray absorber, as necessary. One kind of these additives may be used alone and two or more kinds thereof may be used in combination.

(Other Details of Interlayer Film for Laminated Glass)

The thickness of the interlayer film is defined as T. The thickness of the first layer is preferably 0.0625 T or more, more preferably 0.1 T or more, and preferably 0.4 T or less, more preferably 0.375 T or less, further preferably 0.25 T or less, and especially preferably 0.15 T or less. When the thickness of the first layer is 0.4 T or less, both of the sound insulating properties in a high frequency area and the penetration resistance can be effectively enhanced.

The thickness of each of the second layer and the third layer is preferably 0.3 T or more, more preferably 0.3125 T or more, further preferably 0.375 T or more, and preferably 0.9375 T or less, and more preferably 0.9 T or less. The thickness of each of the second layer and the third layer may be 0.46875 T or less, and 0.45 T or less. Moreover, when the thickness of each of the second layer and the third layer is the above lower limit or more and the above upper limit or less, the penetration resistance and the sound insulating properties of laminated glass are further enhanced.

The total thickness of the second layer and the third layer is preferably 0.625 T or more, more preferably 0.75 T or more, further preferably 0.85 T or more, and preferably 0.9375 T or less, and more preferably 0.9 T or less. Moreover, when the total thickness of the second layer and the third layer is the above lower limit or more and the above upper limit or less, the penetration resistance and the sound insulating properties of laminated glass are further enhanced.

The production method of the interlayer film according to the present invention is not particularly limited. Examples of the production method of the interlayer film according to the present invention include a method of separately forming respective resin compositions used for constituting respective layers into respective layers, and then, for example, layering the respective obtained layers, a method of coextruding respective resin compositions used for constituting respective layers with an extruder and layering the respective layers, and the like. A production method of extrusion-molding is preferred because the method is suitable for continuous production.

Since the production efficiency of the interlayer film is excellent, it is preferred that respective polyvinyl acetal resins contained in the second layer and the third layer be the same as each other, it is more preferred that respective polyvinyl acetal resins contained in the second layer and the third layer be the same as each other and respective plasticizers contained therein be the same as each other, and it is further preferred that the second layer and the third layer be formed from the same resin composition as each other.

It is preferred that at least one surface among surfaces of both sides of the interlayer film have a recess/protrusion shape. It is more preferred that surfaces of both sides of the interlayer film have a recess/protrusion shape. The method for forming the recess/protrusion shape is not particularly limited, and examples thereof include a lip emboss method, an embossing roll method, a calendar roll method, a profile extrusion method, and the like. Since it is possible to quantitatively form many embosses with a recess/protrusion shape constituting a constant uneven pattern, the embossing roll method is preferred.

(Laminated Glass)

Figure 2:
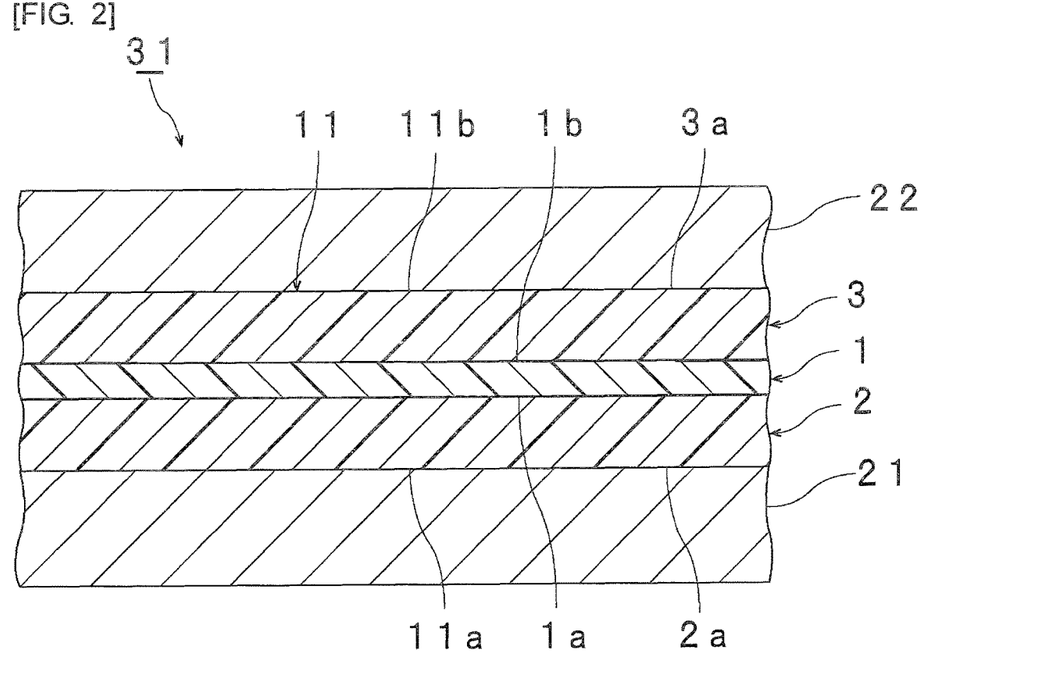
FIG. 2 is a sectional view schematically showing an example of laminated glass prepared with the interlayer film for laminated glass shown in FIG. 1.

FIG. 2 is a sectional view schematically showing an example of laminated glass prepared with the interlayer film for laminated glass shown in FIG. 1.

The laminated glass 31 shown in FIG. 2 is provided with a first lamination glass member 21, a second lamination glass member 22, and an interlayer film 11. The interlayer film 11 is arranged between the first lamination glass member 21 and the second lamination glass member 22 to be sandwiched therebetween.

The first lamination glass member 21 is layered on a first surface 11a of the interlayer film 11. The second lamination glass member 22 is layered on a second surface 11b opposite to the first surface 11a of the interlayer film 11. The first lamination glass member 21 is layered on an outer surface 2a of a second layer 2. The second lamination glass member 22 is layered on an outer surface 3a of a third layer 3.

As described above, the laminated glass according to the present invention is provided with a first lamination glass member, a second lamination glass member, and an interlayer film and the interlayer film is the interlayer film for laminated glass according to the present invention. In the laminated glass according to the present invention, the above-mentioned interlayer film is arranged between the first lamination glass member and the second lamination glass member.

Examples of the lamination glass member include a glass plate, a PET (polyethylene terephthalate) film, and the like. As the laminated glass, laminated glass in which an interlayer film is sandwiched between a glass plate and a PET film or the like, as well as laminated glass in which an interlayer film is sandwiched between two glass plates, is included. The laminated glass is a laminate provided with a glass plate, and it is preferred that at least one glass plate be used. It is preferred that each of the first lamination glass member and the second lamination glass member be a glass plate or a PET film, and the laminated glass be provided with a glass plate as at least one among the first lamination glass member and the second lamination glass member.

Examples of the glass plate include a sheet of inorganic glass and a sheet of organic glass. Examples of the inorganic glass include float plate glass, heat ray-absorbing plate glass, heat ray-reflecting plate glass, polished plate glass, figured glass, wired plate glass, and the like. The organic glass is synthetic resin glass substituted for inorganic glass. Examples of the organic glass include a polycarbonate plate, a poly(meth)acrylic resin plate, and the like. Examples of the poly(meth)acrylic resin plate include a polymethyl (meth) acrylate plate, and the like.

The thickness of the lamination glass member is preferably 1 mm or more, and preferably 5 mm or less, and more preferably 3 mm or less. Moreover, when the lamination glass member is a glass plate, the thickness of the glass plate is preferably 0.5 mm or more, more preferably 0.7 mm or more, and preferably 5 mm or less, and more preferably 3 mm or less. When the lamination glass member is a PET film, the thickness of the PET film is preferably 0.03 mm or more and preferably 0.5 mm or less.

By the use of the interlayer film according to the present invention, the penetration resistance of laminated glass can be maintained high even when the thickness of the laminated glass is thinned. From the viewpoints of attaining reduced weight of laminated glass and decreasing the amount of the material for laminated glass to reduce the environmental load, and improving fuel consumption of an automobile by reduction in weight of laminated glass to reduce the environmental load, the thickness of the glass plate is preferably 2 mm or less, more preferably 1.8 mm or less, even more preferably 1.5 mm or less, further preferably 1 mm or less, still further preferably 0.8 mm or less, and especially preferably 0.7 mm or less.

Since the penetration resistance of laminated glass can be maintained high by the use of the interlayer film according to the present invention even when the thickness of the laminated glass is thinned, the thickness of the laminated glass may be 6 mm or less, may be 4 mm or less, and may be 3.5 mm or less.

The method for producing the laminated glass is not particularly limited. For example, the interlayer film is sandwiched between the first lamination glass member and the second lamination glass member, and then, passed through pressure rolls or subjected to decompression suction in a rubber bag, so that the air remaining between the first lamination glass member and the interlayer film and between the second lamination glass member and the interlayer film is removed, and thus, a laminate is obtained. Afterward, the members are preliminarily bonded together at about 70 to 110° C. to obtain a preliminarily bonded body. Next, by putting the preliminarily bonded body into an autoclave or by pressing the preliminarily bonded body, the members are press-bonded together at about 120 to 150° C. and under a pressure of 1 to 1.5 MPa. In this way, laminated glass can be obtained. At the time of producing the laminated glass, a first layer, a second layer, and a third layer may be layered.

Each of the interlayer film and the laminated glass can be used for automobiles, railway vehicles, aircraft, ships, buildings and the like. Each of the interlayer film and the laminated glass can also be used for applications other than these applications. It is preferred that the interlayer film and the laminated glass be an interlayer film and laminated glass for vehicles or for building respectively, and it is more preferred that the interlayer film and the laminated glass be an interlayer film and laminated glass for vehicles respectively. Each of the interlayer film and the laminated glass can be used for a windshield, side glass, rear glass or roof glass of an automobile, and the like. The interlayer film and the laminated glass are suitably used for automobiles. The interlayer film is suitably used for obtaining laminated glass of an automobile.

From the viewpoint of obtaining laminated glass further excellent in transparency, the visible light transmittance of laminated glass is preferably 65% or more and more preferably 70% or more. The visible light transmittance of laminated glass can be measured in accordance with JIS R3211 (1998). It is preferred that the visible light transmittance of laminated glass obtained by sandwiching the interlayer film for laminated glass according to the present invention between two sheets of green glass (heat ray-absorbing plate glass) with a thickness of 2 mm in accordance with JIS R3208 be 70% or more. The visible light transmittance is more preferably 75% or more.

Hereinafter, the present invention will be described in more detail with reference to examples. The present invention is not limited only to these examples.

The following materials were prepared.
(Polyvinyl Acetal Resin)
Polyvinyl acetal resins shown in the following Tables 2 and 3 were appropriately used. In all polyvinyl acetal resins used, n-butyraldehyde which has 4 carbon atoms is used for the acetalization.

With regard to the polyvinyl acetal resin, the acetalization degree (the butyralization degree), the acetylation degree, and the content of the hydroxyl group were measured by a method in accordance with JIS K6728 "Testing methods for polyvinyl butyral". In this connection, even in the cases of being measured according to ASTM D1396-92, numerical values similar to those obtained by a method in accordance with JIS K6728 "Testing methods for polyvinyl butyral" were exhibited.

(Plasticizer)
Triethylene glycol di-2-ethylhexanoate (3GO)
(Ultraviolet Ray Screening Agent)
Tinuvin 326 (2-(2'-hydroxy-3'-t-butyl-5-methylphenyl)-5-chlorobenzotriazole, "Tinuvin 326" available from BASF Japan Ltd.)
(Oxidation Inhibitor)
BHT (2,6-di-t-butyl-p-cresol)

Example 1

Preparation of Composition for Forming First Layer:
One hundred parts by weight of a polyvinyl acetal resin of a kind shown in the following Table 2, 60 parts by weight of a plasticizer (3GO), 0.2 parts by weight of an ultraviolet ray screening agent (Tinuvin 326), and 0.2 parts by weight of an oxidation inhibitor (BHT) were mixed to obtain a composition for forming a first layer.

Preparation of Composition for Forming Second and Third Layers:
One hundred parts by weight of a polyvinyl acetal resin of a kind shown in the following Table 2, 32 parts by weight of a plasticizer (3GO), 0.2 parts by weight of an ultraviolet ray screening agent (Tinuvin 326), and 0.2 parts by weight of an oxidation inhibitor (BHT) were mixed to obtain a composition for forming a second layer and a third layer.

Preparation of Interlayer Film:
The composition for forming a first layer and the composition for forming a second layer and a third layer were coextruded with a coextruder to prepare an interlayer film (800 μm in thickness) having a layered structure with a stack of a second layer (350 μm in thickness)/a first layer (100 μm in thickness)/a third layer (350 μm in thickness).

Preparation of Laminated Glass a (for Sound Insulating Properties Measurement):

The obtained interlayer film was cut into a size of 55 cm in longitudinal length×55 cm in transversal length. Next, between a sheet of clear float glass (50 cm in longitudinal length×50 cm in transversal length×2 mm in thickness) and a sheet of clear float glass (50 cm in longitudinal length×50 cm in transversal length×1.6 mm in thickness), the interlayer film was sandwiched to obtain a laminate. The laminate was put into a rubber bag and the inside thereof was degassed for 20 minutes at a degree of vacuum of 2.6 kPa, after which the laminate was transferred into an oven while keeping the laminate degassed, and furthermore, held in place at 90° C. for 30 minutes and pressed under vacuum to subject the laminate to preliminary press-bonding. The preliminarily press-bonded laminate was subjected to press-bonding for 20 minutes under conditions of 135° C. and a pressure of 1.2 MPa in an autoclave to obtain a sheet of Laminated glass A.

Preparation of Laminated Glass B (for Pummel Value and Penetration Resistance Measurement):

The obtained interlayer film was cut out into a piece of 100 cm in longitudinal length×100 cm in transversal length. Next, the interlayer film was sandwiched between two sheets of clear glass (30 cm in longitudinal length×30 cm in transversal length×2.5 mm in thickness) and held in place and pressed under vacuum for 30 minutes at 90° C. with a vacuum laminator to obtain a laminate. With regard to the laminate, interlayer film portions protruded from the sheet of glass were cut away to obtain a sheet of Laminated glass B.

Examples 2 to 18

An interlayer film and a sheet of laminated glass were obtained in the same manner as that in Example 1 except that the kind and blending amount of each of the polyvinyl acetal resin and the plasticizer which are used for compositions for forming a first layer, a second layer, and a third layer were set to those listed in the following Tables 2 and 3 and the thicknesses of the first layer, the second layer, and the third layer were set to those listed in the following Tables 2 and 3. Moreover, in Examples 2 to 18, each of the ultraviolet ray screening agent and the oxidation inhibitor of the same kind as that in Example 1 was blended in the same blending amount (0.2 parts by weight relative to 100 parts by weight of the polyvinyl acetal resin) as that in Example 1.

(Evaluation)

(1) Glass Transition Temperature

The interlayer film obtained was stored for 2 months at a temperature of 23° C. and a humidity of 30%, after which each of the surface layers (the second layer and the third layer) was peeled off to isolate an object to be measured and the objects to be measured was press-molded with a press molding machine. With regard to the press-molded object to be measured, the measurement was performed using the "ARES-G2" available from TA Instruments Japan Inc. A parallel plate with a diameter of 8 mm was used as a jig, and the measurement was performed under the condition in which the temperature is decreased from 100° C. to −10° C. at a temperature decreasing rate of 3° C./minute and under the condition of a frequency of 1 Hz and a strain of 1%. In the measurement results obtained, the peak temperature of the loss tangent was defined as the glass transition temperature Tg (° C.).

(2) Sound Insulating Properties

The sound insulating properties of a sheet of Laminated glass A were evaluated with sound transmission losses. The sheet was measured for the sound transmission loss at 20° C. on the basis of JIS A1441-1. Specifically, the sheet was measured in the following way. In an opening between a sound generating room and a sound receiving room, the sheet of Laminated glass A prepared was installed. With the use of an acoustic intensity probe "SI-34" available from RION Co., Ltd., by being scanned at a position apart from the sample installed in the niche opening at the sound receiving room side by 13 cm, the sheet was measured for the average acoustic intensity level. The scanning time was set to 25 to 40 seconds, the scanning rate was set to 0.15 to 0.2 m/second, and an average value was calculated from two kinds of scan pattern measured values.

Sound transmission losses (TL values) at sound frequencies of 2000 Hz, 3150 Hz, 4000 Hz, and 5000 Hz were shown in Tables 2 and 3. The higher this TL value is, the higher in sound insulating properties the sheet of laminated glass is.

(3) Determination of Pummel Value of Laminated Glass

The sheet of laminated glass obtained was stored for 16 hours at a temperature of −18° C.±0.6° C. so that the sheet temperature was adjusted to the temperature. The center part (the part of 150 mm in longitudinal length×150 mm in transversal length) of this sheet of laminated glass was struck by a hammer with a head of 0.45 kg until the glass was broken into pieces having a particle diameter of 6 mm or less and the glass was partially peeled off, after which the degree of exposure of a film portion from which glass pieces were peeled off was measured to determine the pummel value according to the following Table 1. In this connection, the pummel value is a value with which the adhesive force between an interlayer film for laminated glass and a glass plate is evaluated, the pummel value is a value specified by the degree of exposure (% by area) of a film portion from which glass pieces are peeled off when a sheet of laminated glass is stored for 16 hours at a temperature of −18° C.±0.6° C. so that the sheet temperature is adjusted to the temperature, the center part (the part of 150 mm in longitudinal length×150 mm in transversal length) of this sheet of laminated glass is struck by a hammer with a head of 0.45 kg until the glass is broken into pieces having a particle diameter of 6 mm or less, and the glass is partially peeled off, and the pummel value is defined in Table 1. That is, the higher the pummel value is, the higher the adhesive force between the interlayer film and the glass is, and this means that the laminated glass is excellent in anti-scattering properties of glass fragments.

TABLE 1

| Degree of exposure of interlayer film (% by area) | Pummel value |
| --- | --- |
| 90 < Degree of exposure ≤ 100 | 0 |
| 85 < Degree of exposure ≤ 90 | 1 |
| 60 < Degree of exposure ≤ 85 | 2 |
| 40 < Degree of exposure ≤ 60 | 3 |
| 20 < Degree of exposure ≤ 40 | 4 |
| 10 < Degree of exposure ≤ 20 | 5 |
| 5 < Degree of exposure ≤ 10 | 6 |
| 2 < Degree of exposure ≤ 5 | 7 |
| Degree of exposure ≤ 2 | 8 |

(4) Penetration Resistance

The surface temperature of the sheet of laminated glass (30 cm in longitudinal length×30 cm in transversal length) obtained was adjusted to 23° C. Then, in accordance with JIS R3212: 1998, a hard sphere with a mass of 2260 g and a diameter of 82 mm was dropped at the center part of each of six sheets of laminated glass from a height of 4 m. When the hard sphere does not penetrate through each of all the six sheets of laminated glass within 5 seconds after the hard sphere has collided therewith, the laminated glass is acceptable: ○. When sheets of laminated glass through each of which the hard sphere does not penetrate within 5 seconds after the hard sphere has collided therewith are three or less sheets, the laminated glass is not acceptable: x. When sheets of laminated glass through each of which the hard sphere does not penetrate are four sheets, separately, six sheets of laminated glass are evaluated for the penetration resistance. When sheets of laminated glass through each of which the hard sphere does not penetrate are five sheets, separately, one sheet of laminated glass is additionally tested. When the hard sphere does not penetrate through the sheet of laminated glass within 5 seconds after the hard sphere has collided therewith, the laminated glass is acceptable: ○. In the same manner, a hard sphere with a mass of 2260 g and a diameter of 82 mm was dropped at the center part of each of six sheets of laminated glass from a height of 4.0 m, 4.5 m, 5.0 m, 5.5 m, 6.0 m, 6.5 m, or 7.0 m to evaluate the penetration resistance of laminated glass.

In this connection, when the results of the penetration resistance in the cases of heights of 4.0 m to 5.5 m are "○", it can be judged that the laminated glass is excellent in penetration resistance and the effect of enhancing the penetration resistance has been attained. When the result of the penetration resistance in the case of a height of 6.0 m is "○", the laminated glass is further excellent in penetration resistance. When the result of the penetration resistance in the case of a height of 6.5 m is "○", the laminated glass is still further excellent in penetration resistance. When the result of the penetration resistance in the case of a height of 7.0 m is "○", the laminated glass is especially excellent in penetration resistance.

The details and the results are shown in the following Tables 2 and 3. In this connection, in the following Tables 2 and 3, the description of ingredients to be blended other than the polyvinyl acetal resin and the plasticizer was omitted.

TABLE 2

|  |  |  |  | Example 1 | Example 2 | Example 3 | Example 4 | Example 5 |
|---|---|---|---|---|---|---|---|---|
| Composition for forming first layer | Thickness |  | μm | 100 | 125 | 150 | 200 | 100 |
|  | Polyvinyl acetal resin | Average polymerization degree of PVA |  | 3000 | 3000 | 3000 | 3000 | 3000 |
|  |  | Content of hydroxyl group | % by mole | 23.8 | 23.8 | 23.8 | 23.8 | 23.1 |
|  |  | Acetylation degree | % by mole | 12.1 | 12.1 | 12.1 | 12.1 | 12.5 |
|  |  | Acetalization degree | % by mole | 64.1 | 64.1 | 64.1 | 64.1 | 64.5 |
|  |  | Content | Parts by weight | 100 | 100 | 100 | 100 | 100 |
|  | Plasticizer | Kind |  | 300 | 300 | 300 | 300 | 300 |
|  |  | Content | Parts by weight | 60 | 60 | 60 | 60 | 60 |
|  | Glass transition temperature |  | ° C. | −4.2 | −4.2 | −4.2 | −4.2 | −4.7 |
| Composition for forming second and third layers | Respective thicknesses |  | μm | 350 | 425 | 510 | 680 | 350 |
|  | Polyvinyl acetal resin | Average polymerization degree of PVA |  | 1700 | 1700 | 1700 | 1700 | 1700 |
|  |  | Content of hydroxyl group | % by mole | 34.5 | 34.5 | 34.5 | 34.5 | 33.2 |
|  |  | Acetylation degree | % by mole | 0.8 | 0.8 | 0.8 | 0.8 | 0.8 |
|  |  | Acetalization degree | % by mole | 64.7 | 64.7 | 64.7 | 64.7 | 66 |
|  |  | Content | Parts by weight | 100 | 100 | 100 | 100 | 100 |
|  | Plasticizer | Kind |  | 300 | 300 | 300 | 300 | 300 |
|  |  | Content | Parts by weight | 32 | 32 | 32 | 32 | 34 |
|  | Glass transition temperature |  | ° C. | 38.1 | 38.1 | 38.1 | 38.1 | 35.4 |
| Thickness of interlayer film |  |  | μm | 800 | 975 | 1170 | 1560 | 800 |
| Evaluation | Sound insulating properties 2000 Hz |  | dB | 39.5 | 39.8 | 40.1 | 40.7 | 39.5 |
|  | Sound insulating properties 3150 Hz |  | dB | 40.9 | 41.2 | 41.6 | 42.3 | 40.9 |
|  | Sound insulating properties 4000 Hz |  | dB | 41.6 | 41.9 | 42.2 | 42.9 | 41.6 |
|  | Sound insulating properties 5000 Hz |  | dB | 40.8 | 40.8 | 40.9 | 41.0 | 40.6 |
|  | Pummel value |  | Table 1 | 5.0 | 5.0 | 5.0 | 5.0 | 5.0 |
|  | Penetration resistance (it is desirable that no sheet be evaluated as "x" in the cases 4.0 m to 5.5 m) | 4.0 m |  | ○ | ○ | ○ | ○ | ○ |
|  |  | 4.5 m |  | ○ | ○ | ○ | ○ | ○ |
|  |  | 5.0 m |  | ○ | ○ | ○ | ○ | ○ |
|  |  | 5.5 m |  | ○ | ○ | ○ | ○ | ○ |
|  |  | 6.0 m |  | ○ | ○ | ○ | ○ | ○ |
|  |  | 6.5 m |  | ○ | ○ | ○ | ○ | x |
|  |  | 7.0 m |  | x | ○ | ○ | ○ | x |

|  |  |  |  | Example 6 | Example 7 | Example 8 | Example 9 |
|---|---|---|---|---|---|---|---|
| Composition for forming first layer | Thickness |  | μm | 125 | 150 | 200 | 100 |
|  | Polyvinyl acetal resin | Average polymerization degree of PVA |  | 3000 | 3000 | 3000 | 3000 |
|  |  | Content of hydroxyl group | % by mole | 23.1 | 23.1 | 23.1 | 23.1 |
|  |  | Acetylation degree | % by mole | 12.5 | 12.5 | 12.5 | 12.5 |
|  |  | Acetalization degree | % by mole | 64.5 | 64.5 | 64.5 | 64.5 |
|  |  | Content | Parts by weight | 100 | 100 | 100 | 100 |
|  | Plasticizer | Kind |  | 300 | 300 | 300 | 300 |
|  |  | Content | Parts by weight | 60 | 60 | 60 | 60 |

TABLE 2-continued

|  |  |  |  |  |  |  |  |
|---|---|---|---|---|---|---|---|
|  |  | Glass transition temperature | ° C. | −4.7 | −4.7 | −4.7 | −4.7 |
| Composition for forming second and third layers | Respective thicknesses | | μm | 425 | 510 | 680 | 350 |
|  | Polyvinyl acetal resin | Average polymerization degree of PVA | | 1700 | 1700 | 1700 | 1700 |
|  |  | Content of hydroxyl group | % by mole | 33.2 | 33.2 | 33.2 | 32.5 |
|  |  | Acetylation degree | % by mole | 0.8 | 0.8 | 0.8 | 0.8 |
|  |  | Acetalization degree | % by mole | 66 | 66 | 66 | 66.7 |
|  |  | Content | Parts by weight | 100 | 100 | 100 | 100 |
|  | Plasticizer | Kind | | 300 | 300 | 300 | 300 |
|  |  | Content | Parts by weight | 34 | 34 | 34 | 35 |
|  | Glass transition temperature | | ° C. | 35.4 | 35.4 | 35.4 | 34.0 |
| Thickness of interlayer film | | | μm | 975 | 1170 | 1560 | 800 |
| Evaluation | Sound insulating properties 2000 Hz | | dB | 39.8 | 40.2 | 40.6 | 39.5 |
|  | Sound insulating properties 3150 Hz | | dB | 41.1 | 41.5 | 42.2 | 40.9 |
|  | Sound insulating properties 4000 Hz | | dB | 42.0 | 42.1 | 42.7 | 41.6 |
|  | Sound insulating properties 5000 Hz | | dB | 40.7 | 40.8 | 40.9 | 40.4 |
|  | Pummel value | | Table 1 | 5.0 | 5.0 | 5.0 | 5.0 |
|  | Penetration resistance | | 4.0 m | ○ | ○ | ○ | ○ |
|  | (it is desirable that no sheet be evaluated as "x" in the cases 4.0 m to 5.5 m) | | 4.5 m | ○ | ○ | ○ | ○ |
|  |  | | 5.0 m | ○ | ○ | ○ | ○ |
|  |  | | 5.5 m | ○ | ○ | ○ | ○ |
|  |  | | 6.0 m | ○ | ○ | ○ | x |
|  |  | | 6.5 m | ○ | ○ | ○ | x |
|  |  | | 7.0 m | x | ○ | ○ | x |

TABLE 3

|  |  |  |  |  | Example 10 | Example 11 | Example 12 | Example 13 | Example 14 |
|---|---|---|---|---|---|---|---|---|---|
| Composition for forming first layer | Thickness | | μm | | 125 | 150 | 200 | 150 | 200 |
|  | Polyvinyl acetal resin | Average polymerization degree of PVA | | | 3000 | 3000 | 3000 | 3000 | 3000 |
|  |  | Content of hydroxyl group | % by mole | | 23.1 | 23.1 | 23.1 | 23.1 | 23.1 |
|  |  | Acetylation degree | % by mole | | 12.5 | 12.5 | 12.5 | 12.5 | 12.5 |
|  |  | Acetalization degree | % by mole | | 64.5 | 64.5 | 64.5 | 64.5 | 64.5 |
|  |  | Content | Parts by weight | | 100 | 100 | 100 | 100 | 100 |
|  | Plasticizer | Kind | | | 300 | 300 | 300 | 300 | 300 |
|  |  | Content | Parts by weight | | 60 | 60 | 60 | 60 | 60 |
|  | Glass transition temperature | | ° C. | | −4.7 | −4.7 | −4.7 | −4.7 | −4.7 |
| Composition for forming second and third layers | Respective thicknesses | | μm | | 425 | 510 | 680 | 510 | 680 |
|  | Polyvinyl acetal resin | Average polymerization degree of PVA | | | 1700 | 1700 | 1700 | 1700 | 1700 |
|  |  | Content of hydroxyl group | % by mole | | 32.5 | 32.5 | 32.5 | 30.5 | 30.5 |
|  |  | Acetylation degree | % by mole | | 0.8 | 0.8 | 0.8 | 0.8 | 0.8 |
|  |  | Acetalization degree | % by mole | | 66.7 | 66.7 | 66.7 | 68.7 | 68.7 |
|  |  | Content | Parts by weight | | 100 | 100 | 100 | 100 | 100 |
|  | Plasticizer | Kind | | | 300 | 300 | 300 | 300 | 300 |
|  |  | Content | Parts by weight | | 35 | 35 | 35 | 38.5 | 38.5 |
|  | Glass transition temperature | | ° C. | | 34.0 | 34.0 | 34.0 | 29.1 | 29.1 |
| Thickness of interlayer film | | | μm | | 975 | 1170 | 1560 | 1170 | 1560 |
| Evaluation | Sound insulating properties 2000 Hz | | dB | | 39.8 | 40.1 | 40.7 | 40.1 | 40.7 |
|  | Sound insulating properties 3150 Hz | | dB | | 41.2 | 41.5 | 42.2 | 41.5 | 42.3 |
|  | Sound insulating properties 4000 Hz | | dB | | 41.9 | 42.0 | 42.5 | 42.2 | 42.8 |
|  | Sound insulating properties 5000 Hz | | dB | | 40.5 | 40.6 | 40.8 | 40.9 | 40.9 |
|  | Pummel value | | Table 1 | | 5.0 | 5.0 | 5.0 | 5.0 | 5.0 |
|  | Penetration resistance | | 4.0 m | | ○ | ○ | ○ | ○ | ○ |
|  | (it is desirable that no sheet be evaluated as "x" in the cases 4.0 m to 5.5 m) | | 4.5 m | | ○ | ○ | ○ | ○ | ○ |
|  |  | | 5.0 m | | ○ | ○ | ○ | ○ | ○ |
|  |  | | 5.5 m | | ○ | ○ | ○ | ○ | ○ |
|  |  | | 6.0 m | | ○ | ○ | ○ | ○ | ○ |
|  |  | | 6.5 m | | ○ | ○ | ○ | x | ○ |
|  |  | | 7.0 m | | x | ○ | ○ | x | x |

|  |  |  |  | Example 15 | Example 16 | Example 17 | Example 18 |
|---|---|---|---|---|---|---|---|
| Composition for forming first layer | Thickness | | μm | 300 | 400 | 300 | 400 |
|  | Polyvinyl acetal resin | Average polymerization degree of PVA | | 3000 | 3000 | 3000 | 3000 |

TABLE 3-continued

|  |  |  |  |  |  |  |  |
|---|---|---|---|---|---|---|---|
|  |  |  | Content of hydroxyl group | % by mole | 23.8 | 23.8 | 23.8 | 23.8 |
|  |  |  | Acetylation degree | % by mole | 12.1 | 12.1 | 12.1 | 12.1 |
|  |  |  | Acetalization degree | % by mole | 64.1 | 64.1 | 64.1 | 64.1 |
|  |  |  | Content | Parts by weight | 100 | 100 | 100 | 100 |
|  |  | Plasticizer | Kind |  | 300 | 300 | 300 | 300 |
|  |  |  | Content | Parts by weight | 60 | 60 | 60 | 60 |
|  | Glass transition temperature |  |  | ° C. | −4.2 | −4.2 | −4.2 | −4.2 |
| Composition for forming second and third layers | Respective thicknesses |  |  | μm | 435 | 580 | 435 | 580 |
|  | Polyvinyl acetal resin | Average polymerization degree of PVA |  |  | 1700 | 1700 | 1700 | 1700 |
|  |  | Content of hydroxyl group |  | % by mole | 34.5 | 34.5 | 34.5 | 34.5 |
|  |  | Acetylation degree |  | % by mole | 0.8 | 0.8 | 0.8 | 0.8 |
|  |  | Acetalization degree |  | % by mole | 64.7 | 64.7 | 64.7 | 64.7 |
|  |  | Content |  | Parts by weight | 100 | 100 | 100 | 100 |
|  | Plasticizer | Kind |  |  | 300 | 300 | 300 | 300 |
|  |  | Content |  | Parts by weight | 38.5 | 38.5 | 33 | 33 |
|  | Glass transition temperature |  |  | ° C. | 29.1 | 29.1 | 37.8 | 37.8 |
| Thickness of interlayer film |  |  |  | μm | 1170 | 1560 | 1170 | 1560 |
| Evaluation | Sound insulating properties 2000 Hz |  |  | dB | 40.1 | 40.7 | 40.5 | 41.3 |
|  | Sound insulating properties 3150 Hz |  |  | dB | 41.6 | 42.3 | 42.4 | 42.9 |
|  | Sound insulating properties 4000 Hz |  |  | dB | 42.1 | 42.8 | 43.2 | 43.9 |
|  | Sound insulating properties 5000 Hz |  |  | dB | 40.3 | 40.4 | 40.6 | 40.9 |
|  | Pummel value |  |  | Table 1 | 5.0 | 5.0 | 5.0 | 5.0 |
|  | Penetration resistance (it is desirable that no sheet be evaluated as "x" in the cases 4.0 m to 5.5 m) | 4.0 m |  |  | ○ | ○ | ○ | ○ |
|  |  | 4.5 m |  |  | ○ | ○ | ○ | ○ |
|  |  | 5.0 m |  |  | ○ | ○ | ○ | ○ |
|  |  | 5.5 m |  |  | ○ | ○ | ○ | ○ |
|  |  | 6.0 m |  |  | ○ | ○ | ○ | ○ |
|  |  | 6.5 m |  |  | x | ○ | ○ | ○ |
|  |  | 7.0 m |  |  | x | ○ | ○ | ○ |

EXPLANATION OF SYMBOLS

1: First layer
1a: First surface
1b: Second surface
2: Second layer
2a: Outer surface
3: Third layer
3a: Outer surface
11: Interlayer film
11a: First surface
11b: Second surface
21: First lamination glass member
22: Second lamination glass member
31: Laminated glass

The invention claimed is:

1. An interlayer film for laminated glass having a three-layer structure and consisting of a first layer, a second layer, and a third layer,
the first layer containing a polyvinyl acetal resin and a plasticizer, the second layer containing a polyvinyl acetal resin and a plasticizer, and the third layer containing a polyvinyl acetal resin and a plasticizer,
the second layer being arranged on a first surface side of the first layer and the third layer being arranged on a second surface side opposite to the first surface of the first layer,
an acetylation degree of the polyvinyl acetal resin in the first layer being 7% by mole or more and 24% by mole or less,
an acetalization degree of the polyvinyl acetal resin in the first layer being 60% by mole or more and 75% by mole or less,
a content of the plasticizer in the first layer relative to 100 parts by weight of the polyvinyl acetal resin in the first layer being 55 parts by weight or more and 90 parts by weight or less,
an absolute value of the difference between a content of the plasticizer in the second layer relative to 100 parts by weight of the polyvinyl acetal resin in the second layer and the content of the plasticizer in the first layer relative to 100 parts by weight of the polyvinyl acetal resin in the first layer being 20 parts by weight or more,
an absolute value of the difference between a content of the plasticizer in the third layer relative to 100 parts by weight of the polyvinyl acetal resin in the third layer and the content of the plasticizer in the first layer relative to 100 parts by weight of the polyvinyl acetal resin in the first layer being 20 parts by weight or more, and
the interlayer film being provided with the following Constitution A or the following Constitution B,
Constitution A: the glass transition temperature of the second layer being 32° C. or more, the glass transition temperature of the first layer being lower than the glass transition temperature of the second layer, and the thickness of the interlayer film being 790 μm or more and 950 μm or less,
Constitution B: the glass transition temperature of the second layer being 25° C. or more, the glass transition temperature of the first layer being lower than the glass transition temperature of the second layer, and the thickness of the interlayer film being more than 950 μm and 975 μm or less.

2. The interlayer film for laminated glass according to claim 1, being provided with the following Constitution AB',
Constitution AB': the glass transition temperature of the second layer being 32° C. or more, the glass transition temperature of the first layer being lower than the glass transition temperature of the second layer, and the thickness of the interlayer film being 790 μm or more and 975 μm or less.

3. The interlayer film for laminated glass according to claim 1, being provided with the Constitution B.

4. The interlayer film for laminated glass according to claim 1, wherein the glass transition temperature of the third layer is 25° C. or more and
the glass transition temperature of the first layer is lower than the glass transition temperature of the third layer.

5. The interlayer film for laminated glass according to claim 1, wherein the glass transition temperature of the third layer is 32° C. or more and
the glass transition temperature of the first layer is lower than the glass transition temperature of the third layer.

6. A laminated glass, comprising:
a first lamination glass member;
a second lamination glass member; and
the interlayer film for laminated glass according to claim 1,
the interlayer film for laminated glass being arranged between the first lamination glass member and the second lamination glass member.

7. The interlayer film for laminated glass according to claim 1, wherein, in the Constitution A, the thickness of the interlayer film is 850 μm or more and 950 μm or less.

8. The interlayer film for laminated glass according to claim 1, wherein a ratio (T1/(T2+T3)) of the thickness of the first layer (T1) to the total thickness of the second layer and the third layer (T2+T3) is 0.25 or more.

9. The interlayer film for laminated glass according to claim 1, wherein each of the first layer, the second layer, and the third layer further comprises a coupling agent containing silicon, aluminum, or titanium.

10. The interlayer film for laminated glass according to claim 1, further comprising an oxidation inhibitor in an amount of 2% by weight or less in 100% by weight of the layer containing the oxidation inhibitor, the oxidation inhibitor comprising at least one selected from the group consisting of a phenol-based oxidation inhibitor, a sulfur-based oxidation inhibitor, and a phosphorus-based oxidation inhibitor.

11. The interlayer film for laminated glass according to claim 1, wherein the interlayer film is provided with at least one selected from the following constitutions (1), (2) and (3),
constitution (1): the glass transition temperature of the second layer is 38.1° C. or less and the glass transition temperature of the first layer is lower than the glass transition temperature of the second layer by 42.3° C. or more,
constitution (2): the glass transition temperature of the second layer is 35.4° C. or less and the glass transition temperature of the first layer is lower than the glass transition temperature of the second layer by 40.1° C. or more,
constitution (3): the glass transition temperature of the second layer is 34.0° C. or less and the glass transition temperature of the first layer is lower than the glass transition temperature of the second layer by 38.7° C. or more.

12. The interlayer film for laminated glass according to claim 1, wherein the glass transition temperature of the second layer is 38.1° C. or less, and
the glass transition temperature of the first layer is lower than the glass transition temperature of the second layer by 42.3° C. or more.

13. The interlayer film for laminated glass according to claim 1, wherein the glass transition temperature of the second layer is 35.4° C. or less, and
the glass transition temperature of the first layer is lower than the glass transition temperature of the second layer by 40.1° C. or more.

14. The interlayer film for laminated glass according to claim 1, wherein the glass transition temperature of the second layer is 34.0° C. or less, and
the glass transition temperature of the first layer is lower than the glass transition temperature of the second layer by 38.7° C. or more.

15. The interlayer film for laminated glass according to claim 1, wherein the content of the plasticizer in the first layer relative to 100 parts by weight of the polyvinyl acetal resin in the first layer is 60 parts by weight or less, and
the glass transition temperature of the first layer is lower than the glass transition temperature of the second layer by 38.7° C. or more.

16. The interlayer film for laminated glass according to claim 1, wherein the content of the plasticizer in the second layer relative to 100 parts by weight of the polyvinyl acetal resin in the second layer is 32 parts by weight or more, and
the glass transition temperature of the first layer is lower than the glass transition temperature of the second layer by 38.7° C. or more.

17. The interlayer film for laminated glass according to claim 1, wherein a hydroxyl content of the polyvinyl acetal resin in the first layer is 17% by mole or more, and
the glass transition temperature of the first layer is lower than the glass transition temperature of the second layer by 38.7° C. or more.

18. The interlayer film for laminated glass according to claim 1, wherein a hydroxyl content of the polyvinyl acetal resin in the second layer is 32% by mole or more, and
the glass transition temperature of the first layer is lower than the glass transition temperature of the second layer by 38.7° C. or more.

* * * * *